United States Patent
Chatani

(10) Patent No.: US 11,488,089 B2
(45) Date of Patent: Nov. 1, 2022

(54) LOGISTICS SYSTEM, PACKAGE DELIVERY METHOD, AND PROGRAM

(71) Applicant: RAKUTEN GROUP, INC., Tokyo (JP)

(72) Inventor: Masayuki Chatani, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 490 days.

(21) Appl. No.: 16/065,815

(22) PCT Filed: Dec. 29, 2015

(86) PCT No.: PCT/JP2015/086581
§ 371 (c)(1),
(2) Date: Jun. 25, 2018

(87) PCT Pub. No.: WO2017/115447
PCT Pub. Date: Jul. 6, 2017

(65) Prior Publication Data
US 2019/0012631 A1 Jan. 10, 2019

(51) Int. Cl.
G06Q 10/08 (2012.01)
G06Q 50/28 (2012.01)
G08G 5/00 (2006.01)

(52) U.S. Cl.
CPC .......... *G06Q 10/083* (2013.01); *G06Q 50/28* (2013.01); *B64C 2201/141* (2013.01); *G08G 5/0034* (2013.01)

(58) Field of Classification Search
CPC .......... B64C 2201/141; G08G 5/0034; G06Q 10/083; G06Q 10/08355; G06Q 10/08–0838

(Continued)

(56) References Cited

U.S. PATENT DOCUMENTS 8,234,068 B1 * 7/2012 Young .................. G08G 5/0091
  701/528
9,764,836 B1 * 9/2017 Elzinga ................. B64C 39/024
(Continued)

FOREIGN PATENT DOCUMENTS

JP 2002-073765 A 3/2002
JP 2002-099762 A 4/2002
(Continued)

OTHER PUBLICATIONS

Barton, Jeffrey, "Fundamentals of Small Unmanned Aircraft Flight" (2012), Johns Hopkins Technical Digest, vol. 31, No. 2, p. 132-149. (Year: 2012).*

(Continued)

*Primary Examiner* — George Chen
*Assistant Examiner* — Brian A Tallman
(74) *Attorney, Agent, or Firm* — HEA Law PLLC

(57) ABSTRACT

Wait location information acquisition means of a logistics system acquires wait location information on a wait location of each of a plurality of unmanned aerial vehicles. Remaining amount information acquisition means acquires remaining amount information on a remaining amount of a battery or fuel of each of the unmanned aerial vehicles. Package information acquisition means acquires package information on a collection destination and delivery destination of a package. Search means searches for an unmanned aerial vehicle with a remaining amount of the battery or fuel for delivering the package collected at the collection destination to the delivery destination based on the wait location information and remaining amount information on each of the unmanned aerial vehicles and the package information. Instruction means instincts the unmanned aerial vehicle retrieved by the search means to collect and deliver the package.

16 Claims, 13 Drawing Sheets

(58) Field of Classification Search
USPC .......................................................... 705/330
See application file for complete search history.

(56) References Cited

U.S. PATENT DOCUMENTS

| | | | | |
|---|---|---|---|---|
| 9,959,771 | B1* | 5/2018 | Carlson | G08G 5/0039 |
| 2014/0032034 | A1* | 1/2014 | Raptopoulos | G05D 1/0088 |
| | | | | 701/25 |
| 2015/0120094 | A1* | 4/2015 | Kimchi | G05D 1/00 |
| | | | | 701/3 |
| 2015/0353196 | A1* | 12/2015 | van Cruyningen | G01R 31/40 |
| | | | | 701/2 |
| 2015/0379874 | A1* | 12/2015 | Ubhi | G05D 1/106 |
| | | | | 701/3 |
| 2016/0111006 | A1* | 4/2016 | Srivastava | G08G 5/0026 |
| | | | | 701/3 |
| 2017/0069214 | A1* | 3/2017 | Dupray | G08G 5/0013 |
| 2017/0090484 | A1* | 3/2017 | Obaidi | B64D 47/08 |
| 2017/0160735 | A1* | 6/2017 | Mikan | G08G 5/0034 |

FOREIGN PATENT DOCUMENTS

| | | |
|---|---|---|
| JP | 2002-140417 A | 5/2002 |
| JP | 2002-297801 A | 10/2002 |
| JP | 2005-263112 A | 9/2005 |
| JP | 2013-101577 A | 5/2013 |
| JP | 2015-113686 A | 6/2015 |
| JP | 2015-195030 A | 11/2015 |
| JP | 2015-227158 A | 12/2015 |

OTHER PUBLICATIONS

Weinstein, Amanda, and Corey Schumacher. "UAV scheduling via the vehicle routing problem with time windows." AIAA infotech@aerospace 2007 conference and exhibit. 2007. (Year: 2007).*

English translation of the International Search Report for PCT/JP2015/086581.

Office Action dated Mar. 27, 2018, for corresponding JP application No. 2017-558838 and the partial translation thereof.

* cited by examiner

FIG.3

USER X

PLEASE INPUT COLLECTION DESTINATION, DELIVERY DESTINATION, AND WEIGHT OF PACKAGE.

COLLECTION DESTINATION

51 — AKASAKA, MINATO-KU, TOKYO·····

DELIVERY DESTINATION

51 — SHINJUKU, SHINJUKU-KU, TOKYO···

WEIGHT

51 — 100   GRAMS

SEARCH ~52

FIG.4

HERE IS LIST OF UNMANNED AERIAL VEHICLES THAT CAN DELIVER SPECIFIED PACKAGE. PLEASE SELECT UNMANNED AERIAL VEHICLE FOR DELIVERY REQUEST.

| UNMANNED AERIAL VEHICLE | CHARGE | SCHEDULED COLLECTION TIME | SCHEDULED DELIVERY TIME |
|---|---|---|---|
| C | 500YEN | 13:00 | 13:20 |
| B | 800YEN | 13:20 | 13:40 |

REQUEST DELIVERY

FIG.6

| UNMANNED AERIAL VEHICLE ID | OWNER ID | WAIT LOCATION INFORMATION | REMAINING AMOUNT INFORMATION | AERIAL VEHICLE WEIGHT INFORMATION | CURRENT STATE |
|---|---|---|---|---|---|
| v001 | u001 | WAIT LOCATION A | 80% | 3kg | WAITING |
| v002 | u002 | WAIT LOCATION B | 70% | 5kg | WAITING |
| ⋮ | ⋮ | ⋮ | ⋮ | ⋮ | ⋮ |

FIG.7

| DELIVERY ID | REQUESTER ID | PACKAGE INFORMATION | | PACKAGE WEIGHT INFORMATION | UNMANNED AERIAL VEHICLE ID |
| --- | --- | --- | --- | --- | --- |
| | | COLLECTION DESTINATION | DELIVERY DESTINATION | | |
| d001 | u007 | COLLECTION DESTINATION C | DELIVERY DESTINATION E | 100g | v007 |
| d002 | u008 | COLLECTION DESTINATION D | DELIVERY DESTINATION F | 500g | v006 |
| ⋮ | ⋮ | ⋮ | ⋮ | ⋮ | ⋮ |

FIG.8

| WEIGHT | CONSUMPTION AMOUNT |
|---|---|
| ~100g | 3 |
| 101~500g | 5 |
| 501~1000g | 7 |
| ⋮ | ⋮ | und
LOGISTICS SYSTEM, PACKAGE DELIVERY METHOD, AND PROGRAM

CROSS REFERENCE TO RELATED APPLICATIONS

This application is a National Stage of International Application No. PCT/JP2015/086551 filed on Dec. 29, 2015. The contents of the above document is incorporated herein by reference in its entirety.

TECHNICAL FIELD

The present invention relates to a logistics system, a package delivery method, and a program.

BACKGROUND ART

Hitherto, there has been known a technology of delivering a package by using an unmanned aerial vehicle. For example, in Patent Literature 1, there is described a method of causing an unmanned aerial vehicle to fly to a collection destination of a package, collecting the package by using a hoisting machine at the collection destination, and delivering the package to a delivery destination.

CITATION LIST

Patent Literature

[PTL 1] JP 2005-263112 A

SUMMARY OF INVENTION

Technical Problem

When an unmanned aerial vehicle delivers a package, the unmanned aerial vehicle does not stop by at a fueling station of electric power or fuel, for example, an airport, and thus the unmanned aerial vehicle cannot be fueled on the way when the battery or fuel is running out. Even when there is a fueling station on a delivery path, it is difficult to change the destination as appropriate and stop by at the fueling station unlike the case of a manned aerial vehicle in which a pilot makes a determination of such a change. Further, even when the unmanned aerial vehicle can stop by at the fueling station, the electric power or fuel cannot be supplied without a cooperator at the fueling station, and there is also a possibility of the package being stolen at the fueling station. Therefore, the battery or fuel of the unmanned aerial vehicle may become empty on the way and thus the unmanned aerial vehicle may not complete delivery.

The present invention has been made in view of the above-mentioned problem, and an object thereof is to enhance the reliability of completing delivery by an unmanned aerial vehicle.

Solution to Problem

In order to solve the above-mentioned problem a logistics system according to one embodiment of the present invention includes: wait location information acquisition means for acquiring wait location information on a wait location of each of a plurality of unmanned aerial vehicles; remaining amount information acquisition means for acquiring remaining amount information on a remaining amount of a battery or fuel of each of the plurality of unmanned aerial vehicles; package information acquisition means for acquiring package information on a collection destination and delivery destination of a package; search means for searching for an unmanned aerial vehicle with a remaining amount of the battery or fuel for delivering the package collected at the collection destination to the delivery destination based on the wait location information, and remaining amount information on each of the plurality of unmanned aerial vehicles and the package information; and instruction means for instructing the unmanned aerial vehicle, which is retrieved, by the search means, to collect and deliver the package.

A package delivery method according to one embodiment of the present invention includes: a wait location information acquisition step of acquiring wait location information on a wait location of each of a plurality of unmanned aerial vehicles; a remaining amount information acquisition step of acquiring remaining amount information on a remaining amount of a battery or fuel of each of the plurality of unmanned aerial vehicles; a package information acquisition step of acquiring package information on a collection destination and delivery destination of a package; a search step of searching for an unmanned aerial vehicle with a remaining amount of the battery or fuel for delivering the package collected at the collection destination to the delivery destination based on the wait location information and remaining amount information on each of the plurality of unmanned aerial vehicles and the package information; and an instruction step of instructing the unmanned aerial vehicle, which is retrieved in the search step, to collect and deliver the package.

A program according to one embodiment, of the present invention causes a computer to function as: wait location information acquisition means for acquiring wait location information on a wait location of each of a plurality of unmanned aerial vehicles; remaining amount information acquisition means for acquiring, remaining amount information on a remaining amount of a battery or fuel of each of the plurality of unmanned aerial vehicles; package information acquisition means for acquiring package information on a collection destination and delivery destination of a package; search means for searching for an unmanned aerial vehicle with a remaining amount of the battery or fuel for delivering the package collected at the collection destination to the delivery destination based on the wait location information and remaining amount information on each of the plurality of unmanned aerial vehicles and the package information; and instruction means for instructing the unmanned aerial vehicle, which is retrieved by the search means, to collect and deliver the package.

Further, an information storage medium according to one embodiment of the present invention is a computer-readable information storage medium having the above-mentioned program stored thereon.

Further, in one aspect of the present invention, the collection destination and the delivery destination are locations different from the wait location of each of the plurality of unmanned aerial vehicles, the search means includes: first consumption amount acquisition means for acquiring first consumption amount information on a consumption amount of the battery or fuel for flying from the wait location to the collection destination and from the delivery destination to the wait location under a state in which the package is not loaded into each of the plurality of unmanned aerial vehicles; and second consumption amount acquisition means for acquiring second consumption amount information or a consumption amount of the battery or fuel for flying from the collection destination to the delivery destination under a state in which the package is loaded into each of the plurality of unmanned aerial vehicles, and the search means is configured to search for an unmanned aerial vehicle with a remaining amount of the battery or fuel for flying from the wait location to the collection destination, collecting the package, delivering the package to the delivery destination, and returning to the wait location based on the first consumption amount information and second consumption amount information on each of the plurality of unmanned aerial vehicles.

Further, in one aspect of the present invention, the collection destination is a location different from the wait location of each of the plurality of unmanned aerial vehicles, the delivery destination is the wait location of each of the plurality of unmanned aerial vehicles, the search means includes: first consumption amount acquisition means for acquiring first consumption amount information on a consumption amount of the battery or fuel for flying from the wait location to the collection destination under a state in which the package is not loaded into each of the plurality of unmanned aerial vehicles; and second consumption amount acquisition means for acquiring second consumption amount information on a consumption amount of the battery or fuel for flying from the collection destination to the wait location serving as the delivery destination under a state in which the package is loaded into each of the plurality of unmanned aerial vehicles, and the search means is configured to search for an unmanned aerial vehicle with a remaining amount of the battery or fuel for delivering the package by flying from the wait location to the collection destination, collecting the package, and returning to the wait location serving as the delivery destination based on the first consumption amount information and second consumption amount information on each of the plurality of unmanned aerial vehicles.

Further, in one aspect of the present invention, the logistics system further includes: aerial vehicle weight information acquisition means for acquiring aerial vehicle weight information on a weight of each of the plurality of the unmanned aerial vehicles; and package weight information acquisition means for acquiring package weight information on a weight of the package, the first consumption amount acquisition means is configured to acquire the first consumption amount information on each of the plurality of unmanned aerial vehicles based on the aerial vehicle weight information on the each of the plurality of unmanned aerial vehicles, and the second consumption amount acquisition means is configured to acquire the second consumption amount information based on the aerial vehicle weight information on each of the plurality of unmanned aerial vehicles and the package weight information.

Further, in one aspect of the present invention, the logistics system further includes current position information acquisition means for acquiring current position information on a current position of an unmanned aerial vehicle in flight among the plurality of unmanned aerial vehicles, and the search means is configured to search for, when there is an unmanned, aerial vehicle on the way back to the wait location after completing delivery of another package, an unmanned aerial vehicle with a remaining amount of the battery or fuel for flying from the current position to the collection destination, collecting the package, and delivering the collected package to the delivery destination based on the current position information on the unmanned aerial vehicle.

Further, in one aspect of the present invention, the logistics system further includes wind information acquisition means for acquiring wind information on at least one of a wind direction or a wind speed, and the search means is configured to search for an unmanned aerial vehicle with a remaining amount of the battery or fuel for delivering the package in a wind determined based on the wind information.

Further, in one aspect of the present invention, the instruction means is configured to instruct, when a plurality of unmanned aerial vehicles are retrieved by the search means, an unmanned aerial vehicle with a shortest flight distance or flight, time, which is measured from the wait location to the collection destination, to collect and deliver the package.

Further, in one aspect of the present invention, the logistics system is configured to instruct, when a plurality of unmanned aerial vehicles are retrieved by the search means, an unmanned aerial vehicle with a largest, predicted remaining amount of the battery or fuel at a time of completion of delivery of the package, to collect and deliver the package.

Further, in one aspect of the present invention, the logistics system further includes: presentation Means for presenting a list of unmanned aerial vehicles retrieved by the search means to a requester who has requested collection and delivery of the package; and selection reception means for receiving a selection by the requester from the list presented by the presentation means, and the instruction means is configured to instruct an unmanned aerial vehicle selected by the requester to collect and deliver the package.

Further, in one aspect of the present invention, each of the plurality of unmanned aerial vehicles is to be rent by an owner of the each of the plurality of unmanned aerial vehicles to a requester who requests collection and delivery of the package, and the wait location information acquisition means is configured to acquire the wait location information on the wait location specified by the owner of each of the plurality of unmanned aerial vehicles.

Further, in one aspect of the present invention, the logistics system further includes time information acquisition means for acquiring time information on a time period during which the owner of each of the plurality of unmanned aerial vehicles allows renting of the each of the plurality of unmanned aerial vehicles, and the search means is configured to search for an unmanned aerial vehicle capable of delivering the package within a time period indicated by the time information on the unmanned aerial vehicle.

Advantageous Effects of Invention

According to the present, invention, it is possible to enhance the reliability of completing delivery by the unmanned aerial vehicle.

BRIEF DESCRIPTION OF DRAWINGS

FIG. 3 is a diagram for illustrating an example of a request screen for requesting delivery of a package by a requester.

FIG. 4 is a diagram for illustrating an example of the request screen for requesting delivery of the package by the requester.

FIG. 6 is a table for showing an example of storage of data into an unmanned aerial vehicle database.

FIG. 7 is a table for showing an example of storage of data into a delivery database.

FIG. 8 is a table for showing an example of storage of data into a consumption amount database.

DESCRIPTION OF EMBODIMENTS

[1. Hardware Configuration of Logistics System]

In the following, a description is given of a logistics system according to an exemplary embodiment of the present invention. In this embodiment, a description is given of processing of the logistics system taking an exemplary scene in which a requester rents an unmanned aerial vehicle owned by an owner of the unmanned aerial vehicle and a package is delivered.

Figure 1:
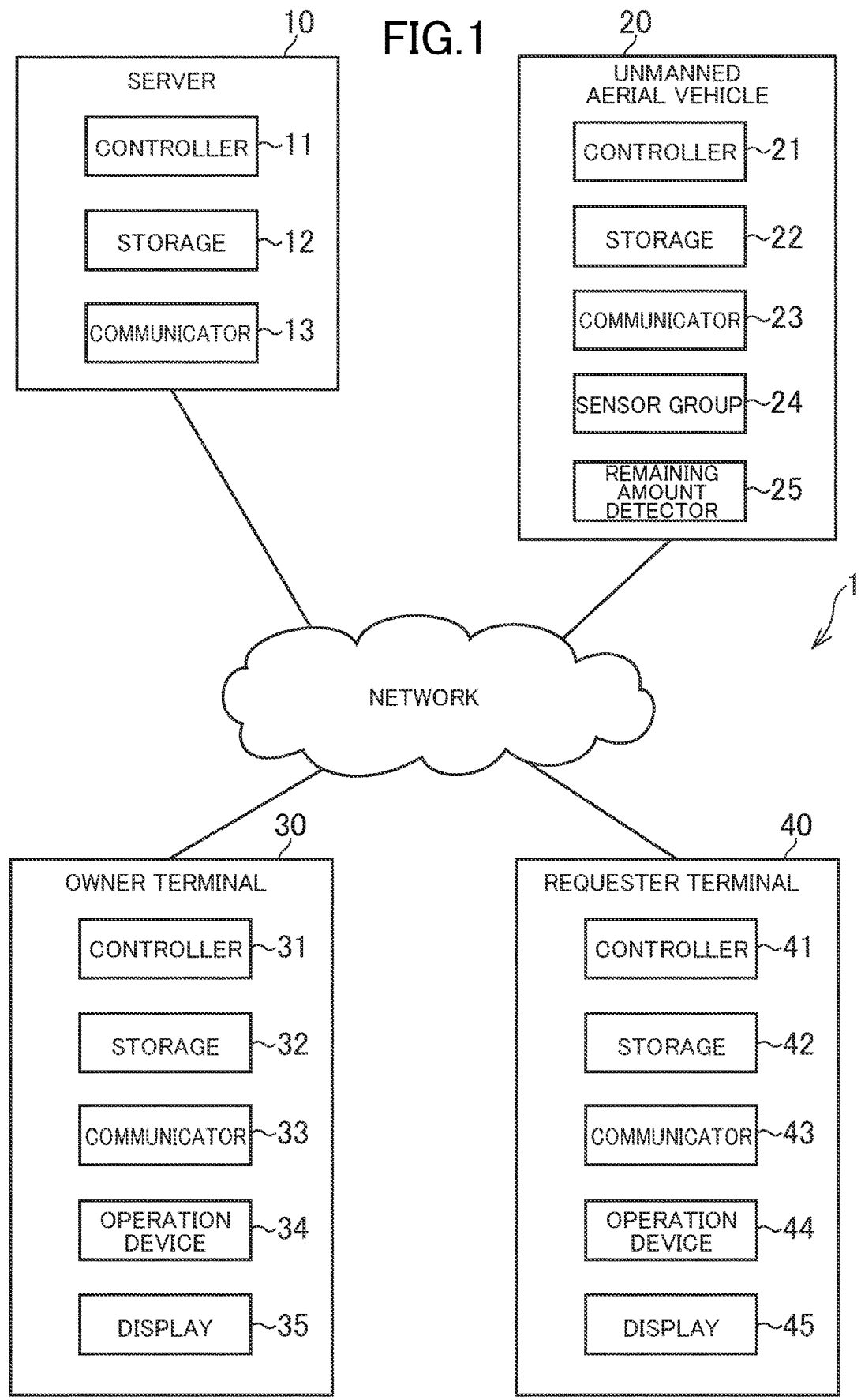
FIG. 1 is a diagram for illustrating a hardware configuration of a logistics system.

FIG. 1 is a diagram for illustrating a hardware configuration of the logistics system. As illustrated in FIG. 1, a logistics system 1 includes a server 10, an unmanned aerial vehicle 20, an owner terminal 30, and a requester terminal 40. The server 10, the unmanned aerial vehicle 20, the owner terminal 30, and the requester terminal 40 are connected to one another via a network so that, those components can communicate data to one another.

The server 10 is a server computer. The server 10 includes a controller 11, a storage 12, and a communicator 13. The controller 11 includes, for example, one or more microprocessors. The controller 11 executes processing in accordance with programs and data stored in the storage 12. The storage 12 includes a main memory and an auxiliary memory. For example, the main memory is a volatile memory, for example, a RAM, and the auxiliary memory is a non-volatile memory such as a hard disk drive or a flash memory. The communicator 13 includes a network card for wired communication or wireless communication. The communicator 13 performs data communication via the network.

The unmanned aerial vehicle 20 is an aerial vehicle that does not accommodate a person, and is, for example, an unmanned aerial vehicle (so-called drone) driven by a battery or an unmanned aerial vehicle driven by an engine. The unmanned aerial vehicle 20 includes a controller 21, a storage 22, a communicator 23, a sensor group 24, and a remaining amount detector 25. The unmanned aerial vehicle 20 includes common hardware components such as a propeller, a motor, and a battery, which are omitted here. Further, the hardware configurations of the controller 21, the storage 22, and the communicator 23 are similar to those of the controller 11, the storage 12, and the communicator 13, and thus a description thereof is omitted here.

In this embodiment, the unmanned aerial vehicle 20 includes a storage portion for storing a package. The storage portion is only required to be a space capable of storing packages, and may be integrated with or separate from a casing of the unmanned aerial vehicle 20. When the storage portion is integrated with the casing of the unmanned aerial vehicle 20, for example, a package room (trunk) included inside the casing of the unmanned aerial vehicle 20 corresponds to the storage portion. When the storage portion is separate from the casing of the unmanned aerial vehicle 20, a container hung from the unmanned aerial vehicle 20 by, for example, a string, wire, chain, or hanging hook, may correspond to the storage portion, or a container connected to; the casing of the unmanned aerial vehicle 20 by, for example, an adhesive or a magnet, may correspond to the storage portion. Further, the storage portion may be made of any storage member, and for example, the storage portion may be a box, sack, net, bag, or receptacle (case) in addition to the package room or container as described above.

The sensor group 24 includes at least one of a GPS sensor, an image sensor (camera), a sound sensor (microphone), an anemometer, an acceleration sensor, a gyro sensor, or an infrared sensor. Any sensor may be mounted on the unmanned aerial vehicle 20, and the sensor group 24 may include a geomagnetic sensor, a height sensor, a displacement sensor, or a temperature sensor.

The remaining amount detector 25 is a battery gauge or a fuel gauge, and detects remaining amount information on the battery or fuel of the unmanned aerial vehicle 20. The remaining amount information indicates the remaining amount, of the battery or fuel, and is represented by a numerical value. Various known techniques are applicable to a method of acquiring the remaining amount information. For example, a coulomb-counter method, a cell-modeling method, or an impedance-track method may be used to detect the remaining amount, of the battery. Further, for example, a mechanical or electric fuel gauge may be used to detect the remaining amount of the fuel.

The owner terminal 30 is a computer to be operated by an owner of the unmanned aerial vehicle 20, and is, for example, a personal computer, a mobile information terminal (including tablet computer) or a cell phone (including smartphone). The owner terminal 30 includes a controller 31, a storage 32, a communicator 33, an operation device 34, and a display 35. The hardware configurations of the controller 31, the storage 32, and the communicator 33 are similar to those of the controller 11, the storage 12, and the communicator 13, and thus a description thereof is omitted here.

The operation device 34 is an input device to be used by a player for operation, and is, for example, a touch panel, a pointing device, for example, a mouse, or a keyboard. The operation device 34 transfers details of operation by the player to the controller 31. The display 35 is, for example, a liquid crystal display or an organic EL display. The display 35 displays a screen in accordance with an instruction given by the controller 31.

The requester terminal 40 is a computer to be operated by a requester of delivery, and is, for example, a personal computer, a mobile information terminal (including tablet computer), or a cell phone (including smartphone). The requester terminal 40 includes a controller 41, a storage 42, a communicator 43, an operation device 44, and a display 45. The hardware configurations of the controller 41, the storage 42, the communicator 43, the operation device 44, and the display 45 are similar to those of the controller 11, the storage 12, the communicator 13, the operation device 34, and the display 35, and thus a description thereof is omitted here.

Programs and data to be described as being stored into the storages 12, 22, 32, and 42 may be supplied thereto via a network. Further, the hardware configurations of the server 10, the unmanned aerial vehicle 20, the owner terminal 30, and the requester terminal 40 are not limited to the above-mentioned examples, and various pieces of computer hardware can be applied. For example, each of the server 10, the unmanned aerial vehicle 20, the owner terminal 30, and the requester terminal 40 may include a reader (e.g., optical disc drive or memory card slot) configured to read a computer-readable information storage medium. In this case, programs and data stored in the computer-readable information storage medium may be supplied to each computer via the reader.

[2. Outline of Processing of Logistics System]

Figure 2:
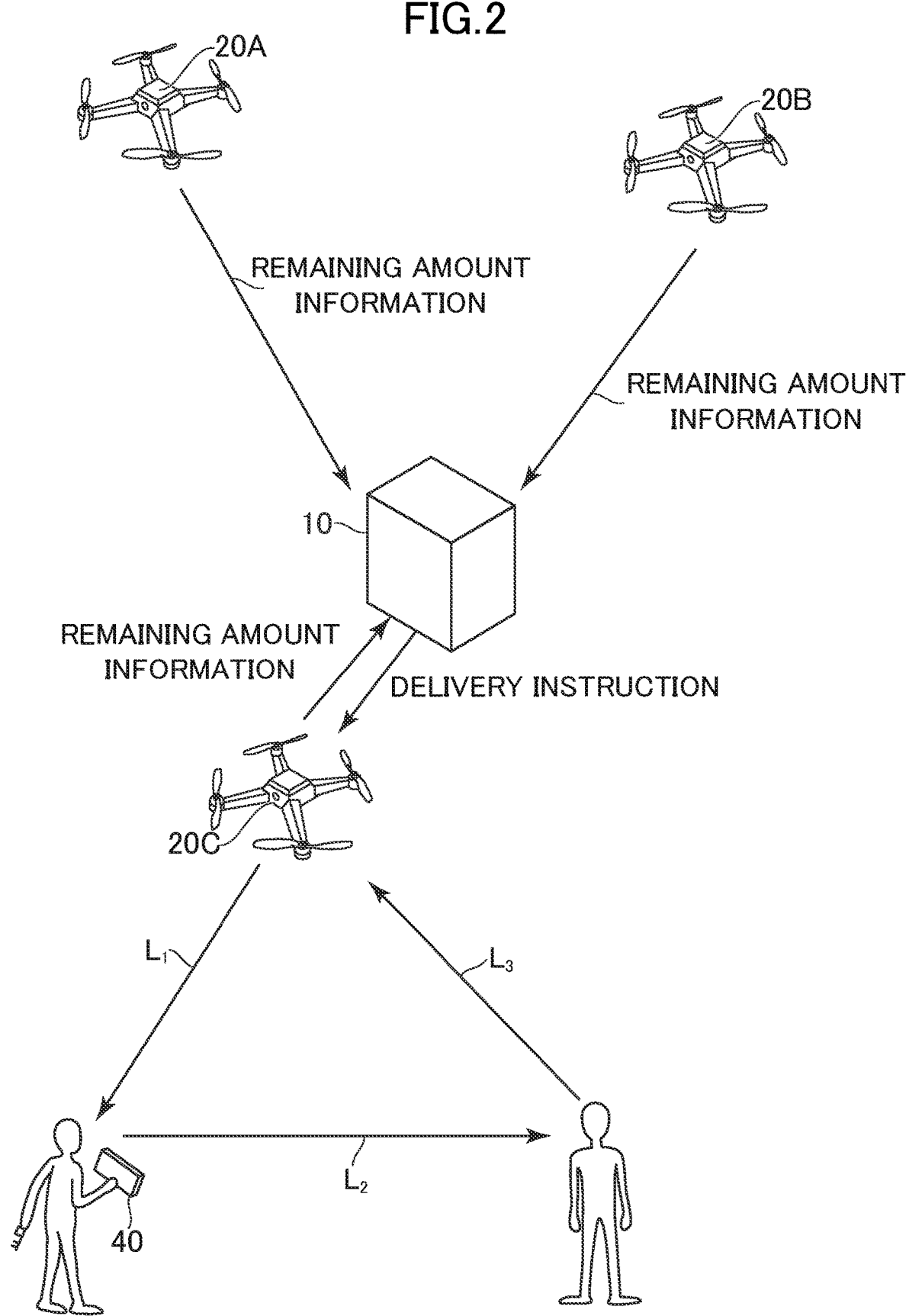
FIG. 2 is a diagram for illustrating an outline of processing of the logistics system.

FIG. 2 is a diagram for illustrating an outline of processing of the logistics system, and FIG. 3 and FIG. 4 are diagrams for illustrating examples of a request, screen for requesting delivery of a package by the requester. The request, screen is displayed on the display 45 of the requester terminal 40. In the example of FIG. 2, it is assumed that three unmanned aerial vehicles 20A to 20C for rent are registered in the server 10. The unmanned aerial vehicles 20A to 20C are waiting at wait locations, for example, houses of respective owners, and periodically transmit pieces of remaining amount information on the own battery or fuel to the server 10. Thus, the server 10 can identify the current remaining amount information on each of the unmanned aerial vehicles 20A to 20C.

As illustrated in FIG. 3, the requester inputs a collection destination, delivery destination, and weight of a package into an input form 51 on the request screen 50. For example, when a key of the requester is to be delivered to a member of his or her family who has gone out without a key of the house, the col lection destination is a location of the requester, the delivery destination is a location of the member of the family, and the weight of the package is the weight of the key. When the requester inputs those pieces of information into the input, form 51 and selects a search button 52, the unmanned aerial vehicle 20 with a remaining amount of the battery or fuel required for completing delivery of the package is searched for and displayed on a list 53 illustrated in FIG. 4.

As illustrated in FIG. 4, the unmanned aerial vehicle 20A, which does not have an enough remaining amount, is not displayed on the list 53, whereas the unmanned aerial vehicles 20B and 20C, which have enough remaining amounts, are displayed on the list 53. The unmanned aerial vehicles 20B and 20C wait at different wait locations, and thus collection and delivery are each performed at different times. Further, a delivery charge may be determined depending on a flight distance required for delivery. For example, when the requester selects the unmanned aerial vehicle 20C on the list 53, and then selects a request button 54, the requester can request the unmanned aerial vehicle 20C to collect and deliver the package. In this manner, in the logistics system 1, the unmanned aerial vehicle 20 with an enough remaining amount of the battery or fuel is requested to collect and deliver the package, to thereby enhance the reliability of completing delivery. In the following, a description is given of details of this technology.

[3. Functions to be Implemented by Logistics System]

Figure 5:
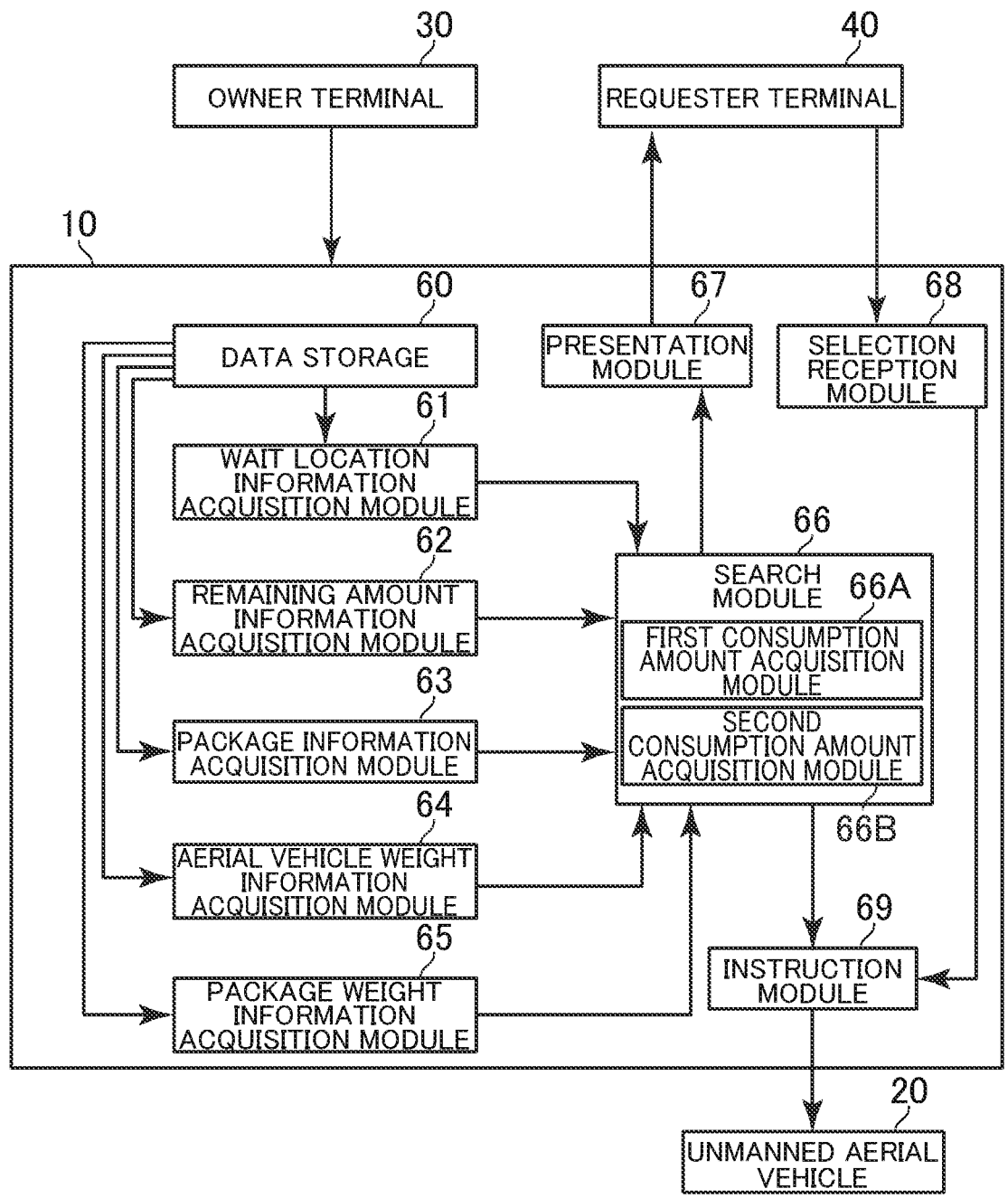
FIG. 5 is a functional block diagram for illustrating an example of functions to be implemented by the logistics system.

FIG. 5 is a functional block diagram for illustrating an example of functions to be implemented by the logistics system 1. As illustrated in FIG. 5, in this embodiment, a description is given of a case in which the server 10 implements a data storage 60, a wait location information acquisition module 61, a remaining amount information acquisition module 62, a package information acquisition module 63, an aerial vehicle weight information acquisition module 64, a package weight information acquisition module 65, a search module 66, a presentation module 67, a selection reception module 68, and an instruction module 69.

[3-1. Data Storage]

The storage 12 mainly implements the data storage 60. The data storage 60 stores data for the unmanned aerial vehicle 20 to deliver a package. In this description, an unmanned aerial vehicle database, a delivery database, and a consumption amount database are described as data to be stored into the data storage 60.

FIG. 6 is a table for showing an example of storage of data into the unmanned aerial vehicle database. The unmanned aerial vehicle database stores data on the unmanned aerial vehicle 20 registered for rent. As shown in FIG. 6, for example, the unmanned aerial vehicle database stores an unmanned aerial vehicle ID for uniquely identifying the unmanned aerial vehicle 20, an owner ID for uniquely identifying an owner, wait location information on the unmanned aerial vehicle 20, remaining amount information on the battery or fuel, aerial vehicle weight information on the weight of the unmanned aerial vehicle 20, and a current state of the unmanned aerial vehicle 20.

The wait location information is information for identifying a location at which the unmanned aerial vehicle 20 is waiting for reception of a delivery instruction. In this embodiment, a description is given of a case in which the wait location information is address information input by the owner, but the wait location information is only required to be information capable of identifying a location on the earth, and may also be latitude/longitude information. When the latitude/longitude information is used as the wait location information, the owner may input the latitude/longitude information, or the latitude/longitude information received from the unmanned aerial vehicle 20 may be stored. When the latitude/longitude information received f rom the unmanned aerial vehicle 20 is used, the wait location information may be updated periodically so as to indicate the current position of the unmanned aerial vehicle 20. The latitude/longitude information is information for identifying a position in the north-south direction and a position in the east-west direction on the earth, and is for example, represented by each numerical value of a degree, an arcminute, and an arcsecond.

The remaining amount, information is remaining amount information received from the unmanned aerial vehicle 20. The aerial vehicle weight information is a numerical value indicating the weight of the unmanned, aerial vehicle 20. The current state is used for identifying whether or not the unmanned aerial vehicle 20 can be rented, and for example, takes any one of "waiting", "collecting", "delivering", or "returning". In this embodiment, the "waiting" means that the unmanned aerial vehicle 20 can be rented, whereas the "collecting", "delivering", and "returning" mean that the unmanned aerial vehicle 20 cannot be rented.

FIG. 7 is a table for showing an example of storage of data into the delivery database. As shown in FIG. 7, the delivery database stores data on the package for which a delivery request has been received. As shown in FIG. 7, for example, the delivery database stores a delivery ID for uniquely identifying delivery, a requester ID for uniquely identifying a requester, package information for indicating a collection destination and delivery destination of the package, package weight information on the weight of the package, and the unmanned aerial vehicle ID.

The collection destination is a location at which the unmanned aerial vehicle 20 is to receive the package. The delivery destination is a location to which the unmanned aerial vehicle 20 is to deliver the package. The package information is only required to be information for identifying the location of the collection destination and the location of the delivery destination, and may be latitude/longitude information. However, the following description is given of a case in which the package information is address information capable of identifying a room of the building. The package weight, information is a numerical value indicating the weight of the package. The package information and the package weight information store details input by the requester into the input form 51. The unmanned aerial vehicle ID is an unmanned aerial vehicle ID of the unmanned aerial vehicle 20 in charge of delivery.

FIG. 8 is a table for showing an example of storage of data into the consumption amount database. As shown in FIG. 8, the consumption amount database stores data on the consumption amount of the battery or fuel in a case where the unmanned aerial vehicle 20 flies. For example, the consumption amount database stores a relationship between a weight and a basic consumption amount, which is a normal consumption amount. The basic consumption amount is a consumption amount of the battery or fuel per predetermined distance (e.g., 1 km). As shown in FIG. 8, as the weight becomes larger, the basic consumption amount, also becomes larger, whereas as the weight becomes smaller, the basic consumption amount also becomes smaller. The relationship between the weight and the basic consumption amount may be defined not in a table format as in FIG. 8 but in a mathematical expression format.

Data to be stored into the data storage 60 is not limited to the above-mentioned example. For example, the unmanned aerial vehicle database may store address information (e.g., email address or IP address) for transmitting an instruction to the unmanned aerial vehicle 20 or model information or performance information on the unmanned aerial vehicle 20. Further, for example, the data storage 60 may store a relationship between the address information and the latitude/longitude information and map data. In other cases, for example, the data storage 60 may store a database that stores basic information on the owner or requester.

[3-2. Wait Location Information Acquisition Module]

The controller 11 mainly implements the wait location information acquisition module 61. The wait location information acquisition module 61 acquires the wait location information on the wait location of each of the plurality of unmanned aerial vehicles 20. The wait location information acquisition module 61 acquires the wait location information stored in the unmanned aerial vehicle database. In this embodiment, the owner of each unmanned aerial vehicle 20 rents the unmanned aerial vehicle 20 to the requester who has requested collection and delivery of the package, and thus the wait location information acquisition module 61 acquires the wait location information indicating the wait location specified by the owner of each unmanned aerial vehicle 20. Thus, the wait location information stored in the unmanned aerial vehicle database indicates the location input by the owner into the operation device 34 of the owner terminal 30.

[3-3. Remaining Amount Information Acquisition Module]

The controller 11 mainly implements the remaining amount information acquisition module 62. The remaining amount information acquisition module 62 acquires the remaining amount information on the remaining amount of the battery or fuel of each unmanned aerial vehicle 20. The remaining amount information acquisition module 62 acquires the remaining amount information stored in the unmanned aerial vehicle database. As described above, each unmanned aerial vehicle 20 periodically transmits its own remaining amount information to the server 10, and thus the remaining amount information of the unmanned aerial vehicle database is updated periodically.

[3-4. Package Information Acquisition Module]

The controller 11 mainly implements the package information acquisition module 63. The package information acquisition module 63 acquires the package information on the collection destination and delivery destination of the package. The package information acquisition module 63 may acquire the package information stored in the delivery database, or may receive the package information from the requester terminal 40. Any locations may be specified as the collection destination and the delivery destination, and for example, the wait location of the unmanned aerial vehicle 20 may be specified as any one of the collection destination and the delivery destination. However, in this embodiment, a description is given of a case in which the collection destination and the delivery destination are different from the wait location.

[3-5. Aerial Vehicle Weight Information Acquisition Module]

The controller 11 mainly implements the aerial vehicle weight information acquisition module 64. The aerial vehicle weight information acquisition module 64 acquires the aerial vehicle weight information on the weight of each unmanned aerial vehicle 20. The aerial vehicle weight information acquisition module 64 acquires the aerial vehicle weight information stored in the unmanned aerial vehicle database. The aerial vehicle weight information may be a weight input by the owner at the time of registration of the unmanned aerial vehicle 20, or may be identified based on the model information on the unmanned aerial vehicle 20 registered by the owner. When the aerial vehicle weight information is identified based on the model information on the unmanned aerial vehicle 20, data indicating a relationship between the model information and the aerial vehicle weight information may be stored in the data storage 60 in advance.

[3-6. Package Weight Information Acquisition Module]

The controller 11 mainly implements the package weight information acquisition module 65. The package weight information acquisition module 65 acquires the package weight information on the weight of the package. The package weight information acquisition module 65 may acquire the package weight information stored in the delivery database, or may receive the package weight information from the requester terminal 40.

[3-7. Search Module]

The controller 11 mainly implements the search module 66. The search module 66 searches for the unmanned aerial vehicle 20 with the remaining amount of the battery or fuel for delivering the package collected at the collection destination to the delivery destination based on the wait location information and remaining amount information on each unmanned aerial vehicle 20 and the package information. The search module 66 calculates the consumption amount of the battery or fuel until completion of delivery by each unmanned aerial, vehicle 20, and searches for the unmanned aerial vehicle 20 with, the remaining amount information equal to or larger than the calculated consumption amount. In this embodiment, the collection destination and the delivery destination are both different from the wait location of the unmanned aerial vehicle 20, and thus the consumption amount until completion of delivery by the unmanned aerial vehicle 20 is an amount consumed from when the unmanned aerial vehicle 20 departs from the wait location to collect the package at the collection destination until the unmanned aerial vehicle 20 returns to the wait location after delivering the package to the delivery destination.

For example, the search module 66 calculates a flight distance until completion of delivery of the package based on the wait location information on each unmanned aerial vehicle 20 and the package information, and acquires the consumption amount based on the flight distance. Data indicating a relationship between the flight distance and the consumption amount may be stored in the data storage 60 in advance. This relationship may be defined in a mathematical expression format or a table format, and is defined so that as the flight distance becomes longer, the consumption amount, also becomes larger, whereas as the flight distance becomes shorter, the consumption amount also becomes smaller.

In this embodiment, a description is given of a case in which the search module 66 includes a first consumption amount acquisition module 66A and a second consumption amount, acquisition module 66B. The first consumption amount acquisition module 66A acquires first consumption amount information on a consumption amount of the battery or fuel for flying from the wait location to the collection destination and from the delivery destination to the wait location under a state in which, the package is not loaded in the unmanned aerial vehicle 20.

For example, the first consumption amount acquisition module 66A acquires a first basic consumption amount of the battery or fuel per predetermined distance in a case where each unmanned aerial vehicle 20 flies without a package. Then, the first consumption amount acquisition module 66A calculates a flight distance $L_1$ (refer to FIG. 2) from the wait location to the collection destination and a flight distance $L_3$ from the delivery destination to the wait location based on the wait location information and the package information. The first consumption amount, acquisition module 66A multiplies a total distance of the flight distance $L_1$ and the flight distance $L_3$ by the first basic consumption amount to acquire the first consumption amount information.

The first basic consumption amount may be a value officially published by a manufacturer of each unmanned aerial vehicle 20, or may be a value input by the owner. However, in this embodiment, a description is given of a case of defining the first basic consumption amount based on the aerial vehicle weight information. For example, the first consumption amount acquisition module 66A acquires the first consumption amount information on each unmanned aerial vehicle 20 based on the aerial vehicle weight information on the unmanned aerial vehicle 20. The first consumption amount acquisition module 66A refers to the consumption amount database to acquire a consumption amount associated with the aerial vehicle weight information as the first basic consumption amount, and multiplies the acquired first basic consumption amount by the total distance.

Meanwhile, the second consumption amount acquisition module 66B acquires second consumption amount information on a consumption amount of the battery or fuel for flying from the collection destination to the delivery destination under a state in which the package is loaded in the unmanned aerial vehicle 20.

For example, the second consumption amount acquisition module 66B acquires a second basic consumption amount of the battery or fuel per predetermined distance in a case where each unmanned aerial vehicle 20 flies with a package. Then, the second consumption amount acquisition module 66B calculates a flight distance $L_2$ (refer to FIG. 2) from the collection destination to the delivery destination based on the package information. The second consumption amount acquisition module 66B multiplies the flight distance $L_2$ by the second basic consumption amount to acquire the second consumption amount information.

The second basic consumption amount may be, similarly to the first basic consumption amount, a value officially published by a manufacturer of each unmanned aerial vehicle 20, or may be a value input by the owner. However, in this embodiment, a description is given of a case of defining the second basic consumption amount based on the aerial vehicle weight, information and the package weight information. For example, the second consumption amount acquisition module 66B acquires the second consumption amount information on each unmanned aerial vehicle 20 based on the aerial vehicle weight, information: on the unmanned aerial vehicle 20 and the package weight information. The second consumption amount acquisition module 66B refers to the consumption amount database to acquire a consumption amount associated with a total weight of the aerial vehicle weight information on each unmanned aerial vehicle 20 and the package weight, information as the second basic consumption amount, and multiplies the acquired second basic consumption amount by the flight distance.

As described above, on the basis of the first consumption amount, information and the second consumption amount information on each unmanned aerial vehicle 20, the search module 66 searches for the unmanned aerial vehicle 20 with the remaining amount of the battery or fuel for flying from the wait location to the collection destination, collecting the package, delivering the package to the delivery destination, and returning to the wait location. The search module 66 refers to the unmanned aerial vehicle database to search for the unmanned aerial vehicle 20 with the remaining amount information indicating the total consumption amount of the first consumption amount information and the second consumption amount information or more from among the unmanned aerial vehicles 20 that can be rented.

[3-8. Presentation Module]

The controller 11 mainly implements the presentation module 67. The presentation module 67 presents the list 53 of the unmanned aerial vehicles 20 retrieved by the search module 66 to the requester who has requested collect ion and delivery of the package. In this embodiment, a description is given of a case in which the server 10 implements the presentation module 67, and thus the presentation module 67 generates display data on the list 53 for transmission to the requester terminal 40, to thereby present the list 53 to the requester. The presentation module 67 refers to the unmanned aerial vehicle database to determine details of display of the list 53. That is, the presentation module 67 acquires pieces of basic information on the unmanned aerial vehicles 20 retrieved by the search module 66 from the unmanned aerial vehicle database, and generates the list 53 containing pieces of information for identifying the retrieved unmanned aerial vehicles 20. Those pieces of information are only required to be information capable of distinguishing between the unmanned aerial vehicles 20, and are, for example, the unmanned aerial vehicle IDs of those unmanned aerial vehicles 20 or the names or owners' names of those unmanned aerial vehicles 20.

[3-9. Selection Reception Module]

The controller 11 mainly implements the selection reception module 68. The selection reception module 68 receives a selection by the requester from the list 53 presented by the presentation module 67. The selection reception module 68 receives a selection of any one of one or more unmanned aerial vehicles 20 displayed on the list 53. In this embodiment, a description is given of a case in which the server 10 implements, the selection reception module 68, and thus the selection reception module 68 receives information for identifying the unmanned aerial vehicle 20 selected by the requester through use of the operation device 44 of the requester terminal 40.

[3-10. Instruction Module]

The controller 11 mainly implements the instruction module 69. The instruction module 69 instructs the unmanned aerial vehicle 20 retrieved by the search module 66 to collect and deliver the package. In this embodiment, this instruction is referred to as "delivery instruction". When there is only one unmanned aerial vehicle 20 retrieved by the search module 66, the instruction module 69 may automatically give an instruction to the unmanned aerial vehicle 20 without selection by the requester. Further, when there are a plurality of unmanned aerial vehicles 20 retrieved by the search module 66, the instruction module 69 may automatically select one unmanned aerial vehicle 20 by a predetermined determination method. However, in this embodiment, a description is given of a case of allowing the requester to select one unmanned aerial vehicle 20. Thus, the instruction module 69 instructs the unmanned aerial vehicle 20 selected by the requester to collect and deliver the package.

The instruction module 69 transmits data having a predetermined format to the unmanned aerial vehicle 20 to give a delivery instruction. It is assumed that the delivery instruction contains address information or latitude/longitude information on the collection destination and the delivery destination. When the delivery instruction contains the address information, the unmanned aerial vehicle 20 stores a relationship between the address information and the latitude/longitude information in advance, and the unmanned aerial vehicle 20 converts the address information into the latitude/longitude, information. When the delivery destination contains the latitude/longitude information, the latitude/longitude information is two-dimensional information, and thus the instruction module 69 may indicate three-dimensional information containing height information in addition to the latitude/longitude information. Further, an instruction given by the instruction module 69 may contain other information, and for example, may contain information for identifying the requester.

[4. Processing to be Executed by Logistics System]

Figure 9:
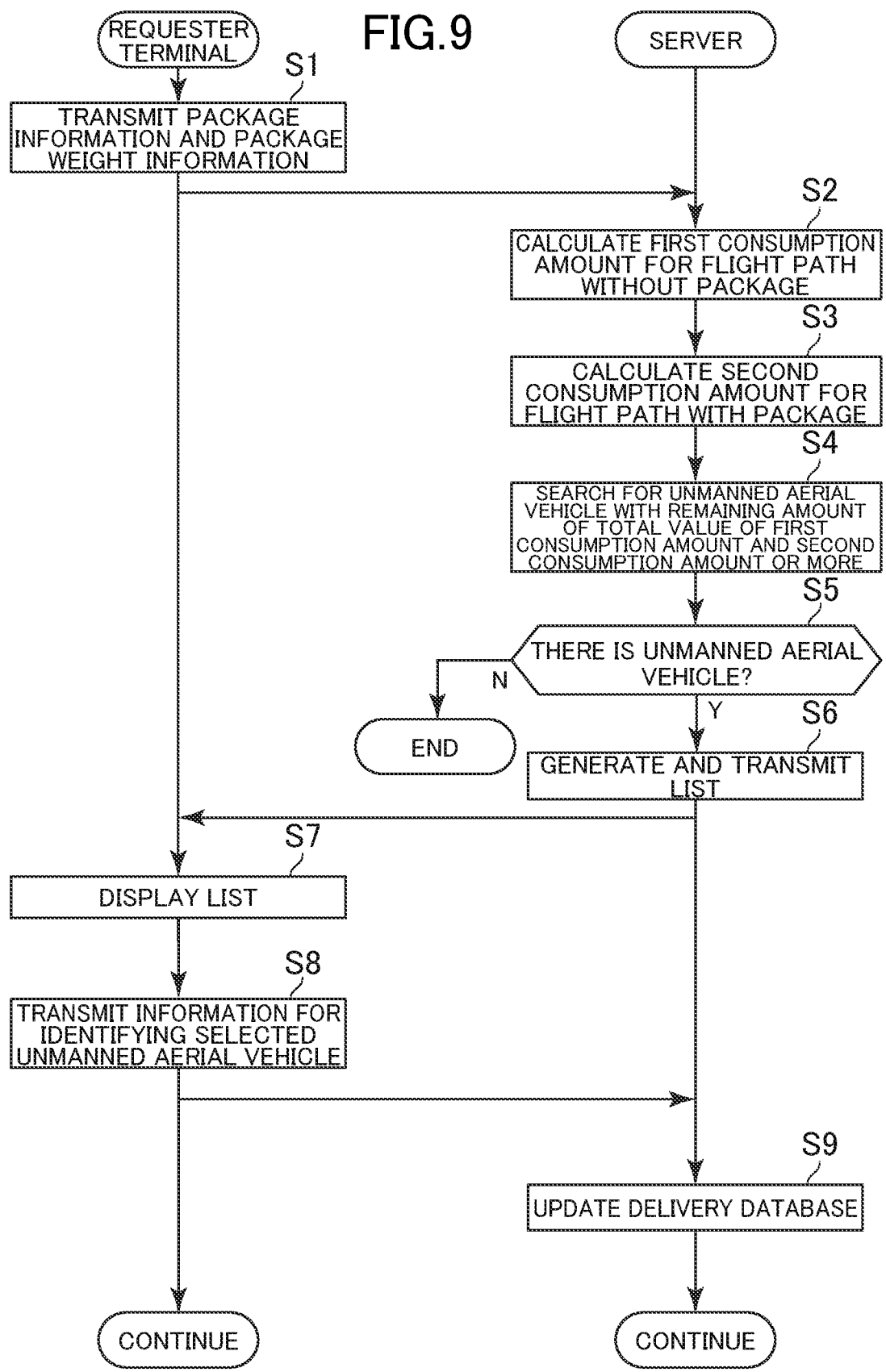
FIG. 9 is a flowchart for illustrating an example of processing to be executed by the logistics system.
Figure 10:
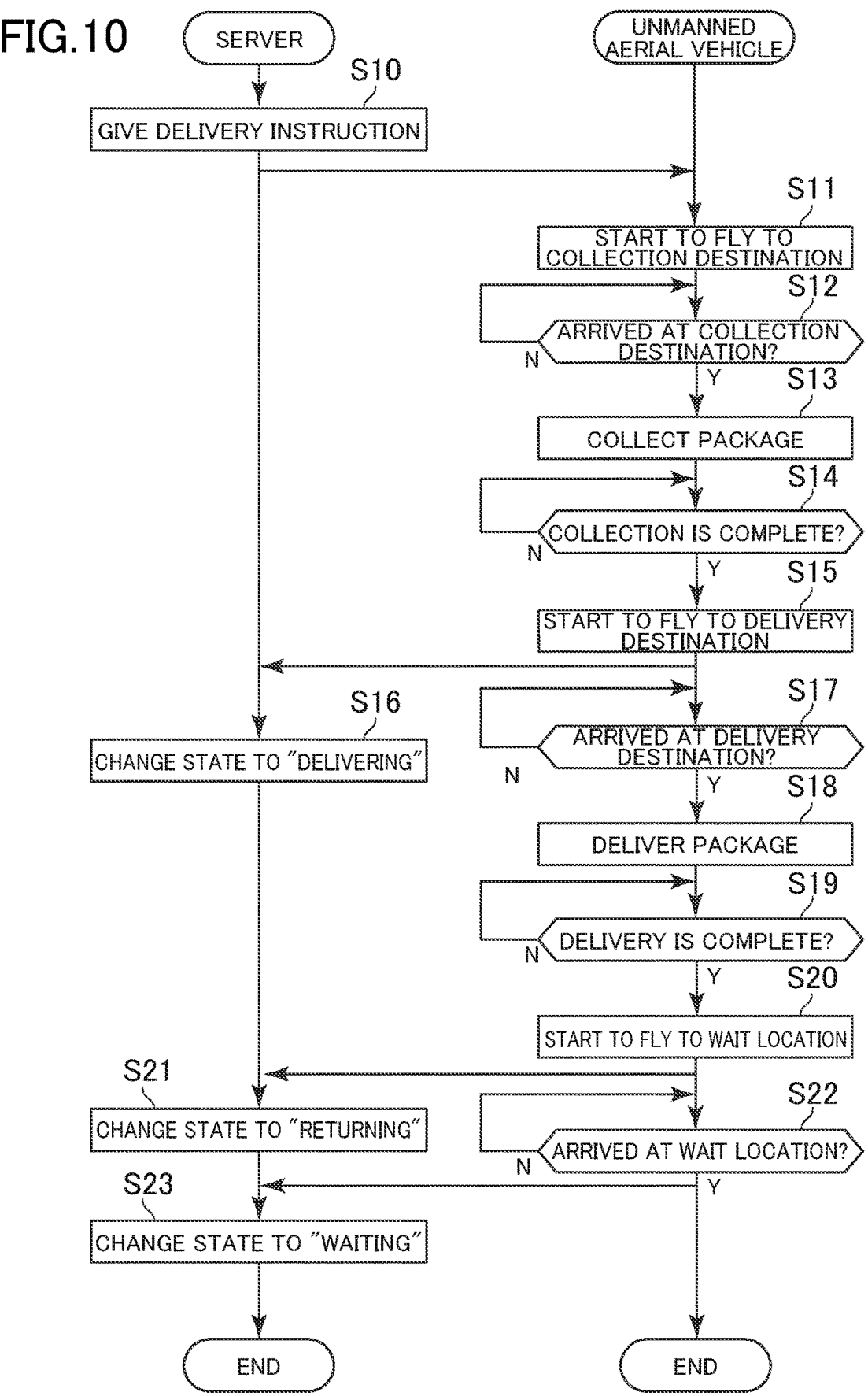
FIG. 10 is a flowchart for illustrating an example of the processing to be executed by the logistics system.

FIG. 9 and FIG. 10 are flowcharts for illustrating an example of processing to be executed by the logistics system 1. The processing illustrated in FIG. 9 and FIG. 10 is executed by the controllers 11, 21, 31, and 41 operating in accordance with programs stored in the storages 12, 22, 32, and 42, respectively. The processing described below is an example of processing to be executed by the functional blocks illustrated in FIG. 5.

As illustrated in FIG. 9, the controller 41 of the requester terminal 40 transmits the package information and package weight information input on the request screen 50 to the server 10 (Step S1). The storage 42 stores the requester ID, and in Step S1, the controller 41 also transmits the requester ID.

When the controller 11 of the server 10 receives details of input, the controller 11 acquires the first consumption amount information for a flight path without the package based on the aerial vehicle Weight information on each unmanned aerial vehicle 20 and the package, information (Step S2). In Step S2, the controller 11 refers to the unmanned aerial vehicle database to identify the unmanned aerial vehicle 20 that can be rented ("waiting" in this embodiment), and acquires the wait location and aerial vehicle weight information on the identified unmanned aerial vehicle 20. The controller 11 refers to the consumption amount database to acquire the first consumption amount information by multiplying the first basic consumption amount, which is associated with the aerial vehicle weight information on each unmanned aerial vehicle 20, by a total distance of the flight distance $L_1$, which is measured from the wait location of the unmanned aerial vehicle 20 to the collection destination, and the flight distance L3, which is measured from the delivery destination to the wait location.

The controller 11 acquires the second consumption amount, information for a flight path with the package based on the aerial vehicle weight information on each unmanned aerial vehicle 20, the package information, and the package weight information (Step S3). In Step S3, the controller 11 refers to the consumption amount, database to acquire the second basic consumption amount associated with the total weight of the aerial vehicle weight information on the unmanned aerial vehicle 20 that can be rented and the package weight information on the weight of the package. The controller 11 multiplies the second basic consumption amount of each unmanned aerial vehicle 20 by a flight distance $L_2$ from the collection destination to the delivery destination, to thereby acquire the second consumption amount information.

On the basis of the remaining amount information on each unmanned aerial vehicle 20 stored in the unmanned aerial vehicle database, the controller 11 searches for the unmanned aerial vehicle 20 with the remaining amount information indicating a value equal to or more than a total value of the first consumption amount information acquired in Step S2 and the second consumption amount information acquired in Step S3 (Step S4). The controller 11 determines whether or not there is an unmanned aerial vehicle 20 retrieved in Step S4 (Step S5). When there is no retrieved unmanned aerial vehicle 20 (Step S5: N), the processing ends. In this case, the controller 11 may transmit an error message indicating that there is no available unmanned aerial vehicle 20 to the requester terminal 40.

On the other hand, when the unmanned aerial vehicle 20 is retrieved (Step S5: Y), the controller 11 generates the list 53 containing information for identifying the unmanned aerial vehicles 20 retrieved in Step S4 based on the unmanned aerial vehicle database, and transmits the list 53 to the requester terminal 40 (Step S6). In Step S6, the controller 11 generates display data of the list 53 for transmission to the requester terminal 40. It is assumed that the controller 11 also transmits the unmanned aerial vehicle IDs of the unmanned aerial vehicles 20 selectable in the list 53. When only one unmanned aerial vehicle 20 is retrieved, the list 53 in which the unmanned aerial vehicle 20 is already selected may be transmitted, or the processing of from Step S6 to Step S9 may be omitted, and the processing may transition to Step S10 described later.

The requester terminal 40, which has received, the display data or the list 53, displays the list 53 on the display 45 (Step S7). On the basis a signal from the operation device 44, the controller 41 transmits information for identifying the unmanned aerial vehicle 20 selected by the requester from the list 53 to the server 10 (Step S8). In Step S8, when the user selects the request button 54 with the unmanned aerial vehicle 20 selected from the list 53, the controller 41 transmits the unmanned aerial vehicle ID of the selected unmanned aerial vehicle 20 to the server 10.

When the server 10 receives the information, the controller 11 receives the delivery request from the requester, and updates the delivery database (Step S9). In Step S9, the controller 11 issues a new delivery ID, and stores into the delivery database the new delivery ID together with the requester ID, package information, and package weight information received in Step S2 and the unmanned aerial vehicle ID received in Step S9. The package information received in Step S2 is address information, and thus in Step S9, the controller 11 may store into the delivery database the package information obtained by converting the address information into the latitude/longitude information.

Referring to FIG. 10, the controller 11 gives a delivery instruction to the unmanned aerial vehicle 20 selected by the requester based on the unmanned aerial vehicle database (Step S10). In Step S10, the controller 11 transmits the delivery instruction containing the package information and the requester information to the unmanned aerial vehicle 20. Further, the controller 11 changes the state of the unmanned aerial vehicle 20 in the unmanned aerial vehicle database, to "collecting".

When the unmanned aerial vehicle 20 receives the delivery instruction, the controller 21 starts to fly to the collection destination based on the package information (Step S11). A method of flying to a specified location by the unmanned aerial vehicle 20 may be performed by a known automatic maneuvering method. For example, the unmanned aerial vehicle 20 may set the latitude/longitude information acquired from the GPS sensor of the sensor group 24 as the current location, and set the latitude/longitude information on the collection destination received in Step S11 as the destination location to automatically fly. Then, the unmanned aerial vehicle 20 may control the propeller so that the direction from the current value toward the destination location is the progress direction. The progress direction may be determined by using the direction obtained from the geomagnetic sensor of the sensor group 24.

The controller 21 determines whether or not the unmanned aerial vehicle 20 has arrived at the collection destination (Step S12). In Step S12, the controller 21 determines whether or not the latitude/longitude information on the current location and the latitude/longitude information on the destination location match each other. When it is determined that the unmanned aerial vehicle 20 has arrived at the collection destination (Step S12: Y), the controller 21 executes processing of collecting the package (Step S13). Collection of the package may be executed in accordance with a procedure defined in advance. For example, when the unmanned aerial vehicle 20 has arrived at the collection destination, the unmanned aerial vehicle 20 descends to a height within reach of the requester. When the unmanned aerial vehicle 20 approaches the requester, the requester stores the package into the storage portion. The requester may display a predetermined image on the requester terminal 40 to send a signal to the unmanned aerial vehicle 20. In this case, the unmanned aerial vehicle 20 may use a camera of the sensor group 24 to move in a direction in which the predetermined image is detected at the collection destination. The predetermined image may be stored in the unmanned aerial vehicle 20 in advance, and may be detected by template matching.

The controller 21 determines whether or not collection of the package is complete (Step S14). Completion of collection may be determined based on an operation by the requester, or may be determined by the unmanned aerial vehicle 20 based on a result of detection by the sensor group 24. When an operation of the requester is used, a predetermined operation on the requester terminal 40 by the requester causes transmission of data indicating completion of collection to the unmanned aerial vehicle 20. The unmanned aerial vehicle 20 determines that collection is complete by receiving the data. Meanwhile, when the unmanned aerial vehicle 20 determines completion of collection, the unmanned aerial vehicle 20 may determine whether or not a weight detected by a weight sensor of the sensor group 24 has increased.

When it is determined that collection is complete (Step S14: Y), the controller 21 transmits a collection completion notification, indicating completion of collection to the server 10, and starts to fly to the delivery destination (Step S15). Processing of starting to fly to the delivery destination may be similar to that of Step S11, and the controller 21 sets the delivery destination as the destination location to start to fly. When the server 10 receives the collection completion notification, the controller 11 changes the state of the unmanned aerial vehicle 20 in the unmanned aerial vehicle database to "delivering" (Step S16).

The controller 21 determines whether or not the unmanned aerial vehicle 20 has arrived at the delivery destination (Step S17). In Step S17, the controller 21 determines whether or not the latitude/longitude information on the current location and the latitude/longitude information on the destination location match each other. When it is determined that the unmanned aerial vehicle 20 has arrived at the delivery destination (Step S17: Y), the controller 21 executes processing of delivering the package (Step S18). Delivery of the package may be executed in accordance with a procedure defined in advance. For example, when the unmanned aerial vehicle 20 has arrived at the delivery destination, the unmanned aerial vehicle 20 lowers its height to a level within reach of a recipient. The recipient opens a package storage portion of the unmanned aerial vehicle 20 to receive the package stored in the storage portion. Similarly to the case of collecting the package, the recipient may display a predetermined image on a terminal, for example, a smartphone, to send a signal to the unmanned aerial vehicle 20.

The controller 21 determines whether or not delivery of the package is complete (Step S19). Completion of delivery may be determined by an operation by the recipient, or may be determined by the unmanned aerial vehicle 20 based on a result, of detection by the sensor group 24. When an operation of the recipient is used, a predetermined operation on the own terminal 30 by the recipient causes transmission of data indicating completion of reception of the package to the unmanned aerial vehicle 20. The unmanned aerial vehicle 20 determines that delivery is complete by receiving the data. Meanwhile, when the unmanned aerial vehicle 20 determines completion of delivery, the unmanned aerial vehicle 20 may determine whether or not the weight detected by the weight sensor of the sensor group 24 has decreased.

When it is determined that the delivery is complete (Step S19: Y), the controller 21 transmits a delivery completion notification indicating that delivery is complete to the server 10 to start to fly to the wait location (Step S20). Processing of starting to fly to the wait location may be similar to that of Step S11, and the controller 21 sets the own wait location as the destination location to start to fly. The latitude/longitude information on the wait location may be stored in the storage 22 in advance. Further, when the server 10 receives a delivery completion notification, the controller 11 changes the state of the unmanned aerial vehicle 20 in the unmanned aerial vehicle database to "returning" (Step S21).

The controller 21 determines whether or not the unmanned aerial vehicle 20 has arrived at the wait location (Step S22). In Step S22, the controller 21 determines whether or not the latitude/longitude information on the current location and the latitude/longitude information on the destination location match each other. When it is determined that the unmanned aerial vehicle 20 has arrived at the wait location (Step S22: Y), the controller 21 transmits a return completion notification indicating that the unmanned aerial vehicle 20 has arrived at the wait location to the server 10, and when the server 10 receives the return completion notification, the controller 11 changes the state of the unmanned aerial vehicle 20 in the unmanned aerial vehicle database to "waiting" (Step S23), and ends the processing.

According to the logistics system 1 described above, the unmanned aerial vehicle 20 with the remaining amount information indicating a remaining amount sufficient enough to deliver the package is retrieved, and an instruction to deliver the package is given. Thus, it is possible to prevent the remaining amount of the battery or fuel from being exhausted on the way to result in a failure to deliver the package or to return to the wait location. Therefore, it is possible to enhance the reliability of the unmanned aerial vehicle 20 completing delivery of the package.

Further, when the unmanned aerial vehicle 20 flies with the package, the consumption amount of the battery or fuel becomes larger compared to the case of flying without the package. Thus, the consumption amount information on each of a flight path with the package and a flight path without the package is acquired, to thereby be able to acquire the consumption amount information more accurately. Through improvement of the accuracy of the consumption amount information, the accuracy of retrieving the unmanned aerial vehicle 20 with the remaining amount, information indicating a remaining amount sufficient enough to deliver the package is also improved. Therefore, it is possible to complete delivery of the package more reliably.

Further, the consumption amount, information on a path in which the unmanned aerial vehicle 20 flies with the package is acquired based on the weight information on the package, to thereby be able to acquire the consumption amount information that depends on the package. Therefore, it is possible to improve the accuracy of the consumption amount, information. As a result, it is also possible to further improve the reliability of completing delivery of the package.

Further, the package is delivered to the unmanned aerial vehicle 20 selected by the user from the list 53, to thereby allow the user to request, the unmanned aerial vehicle 20 suited to the user's preference to deliver the package. For example, when the predicted time at which each unmanned aerial vehicle 20 is to arrive at the collection destination or the delivery charge is displayed on the list 53, the user can select the unmanned aerial vehicle 20 that arrives at the collection destination early or select, the unmanned aerial vehicle 20 for which the delivery charge is low. Further, for example, the user can determine the reliable unmanned aerial vehicle 20 based on reviews on the Internet, and can select the unmanned aerial, vehicle 20.

Further, the wait location of each unmanned aerial vehicle 20 is a location specified by the owner, and thus when the owner rents the unmanned aerial vehicle 20, the owner can register the wait location by himself or herself.

[5. Modification Examples]

The present invention is not limited to the embodiment described above, and can be modified suitably without, departing from the spirit of the present invention.

Figure 11:
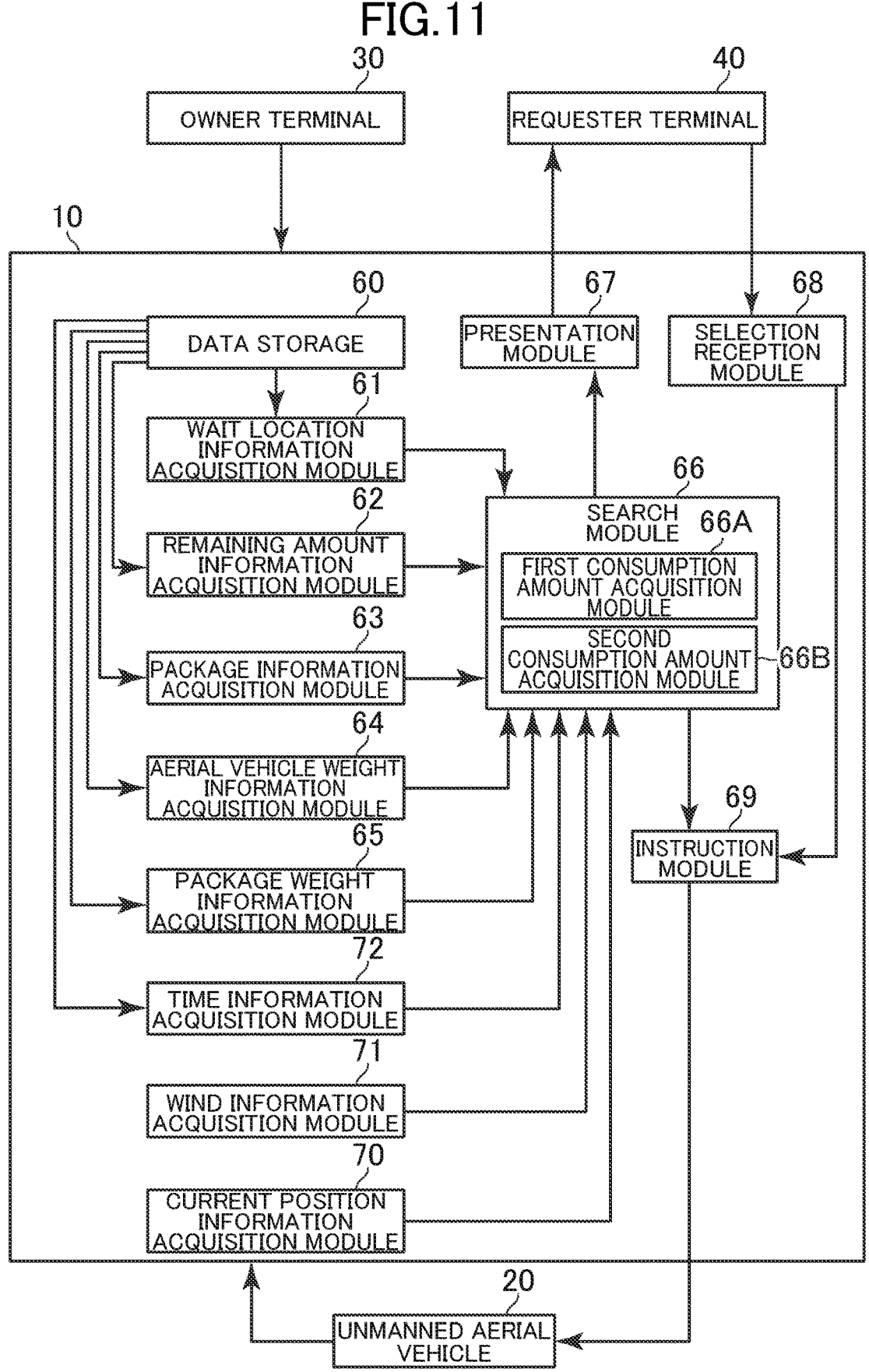
FIG. 11 is a functional block diagram in modification examples of the present invention.

FIG. 11 is a functional block diagram in modification examples of the present invention. As illustrated in FIG. 11, in the modification examples of the present invention described below, in addition to the functions of the embodiment, a current position information acquisition module 70, a wind information acquis it ion module 71, and a time information acquisition module 72 are implemented. Now, a description is given of a case in which the server 10 implements each of those functions.

(1) For example, in the description of the embodiment, the wait location of each unmanned aerial vehicle 20 and the delivery destination are different from each other, and the unmanned aerial vehicle 20 delivers the package to the recipient. However, the unmanned aerial vehicle 20 may bring the package back to the wait location, and the recipient, may go to the wait location to receive the package.

Figure 12:
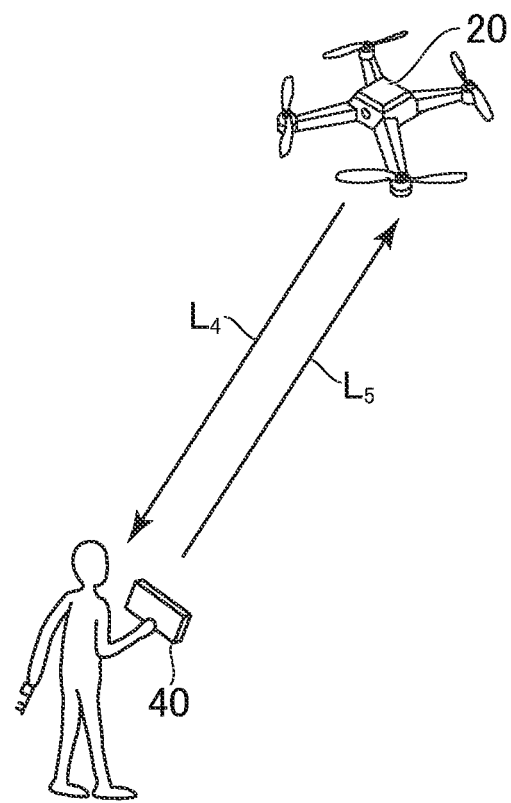
FIG. 12 is a diagram for illustrating movement of the unmanned aerial vehicle in Modification Example (1) of the present invention.

FIG. 12 is a diagram for illustrating movement of the unmanned aerial vehicle 20 in Modification Example (1) of the present invention. As illustrated in FIG. 12, in Modification Example (1), a description is given of a case in which the collection destination is a location different from the wait location of each unmanned aerial vehicle 20, but the delivery destination is a wait location of each unmanned aerial vehicle 20. In this case, a method of calculating the consumption amount of the battery or fuel until delivery of each unmanned aerial vehicle 20 is complete is different from the calculation method in the embodiment.

The first consumption amount acquisition module 66A acquires first consumption amount information on a consumption amount, of the battery or fuel for flying from the wait location to the collection destination under a state in which the package is not loaded in the unmanned aerial vehicle 20. First, the first consumption amount acquisition module 66A acquires the first, basic consumption amount similarly to the embodiment. Then, the first consumption amount acquisition module 66A calculates a flight distance $L_4$ from the wait location to the collection destination based on the wait location information and the package information. The first consumption amount acquisition module 66A multiplies the flight distance $L_4$ by the first basic consumption amount to acquire the first consumption amount information. In Modification Example (1), the unmanned aerial vehicle 20 returns to the wait location under a state in which the package is loaded in the unmanned aerial vehicle 20, and thus Modification Example (1) is different from the embodiment in that, the consumption amount required for the path (flight distance $L_3$ of FIG. 2) to return to the wait location is not considered in the calculation of the first consumption amount information.

The second consumption amount acquisition module 66B acquires the second consumption amount information on the consumption amount of the battery or fuel for flying from the collection destination to the wait location serving as the delivery destination under a state in which the package is loaded in the unmanned aerial vehicle 20. First, the second consumption amount acquisition module 66B acquires the second basic consumption amount similarly to the embodiment. Then, the second consumption amount acquisition module 66B calculates a flight distance $L_5$ from the collection destination to the wait location (that is, delivery destination). The flight distance $L_4$ and the flight distance $L_5$ may be the same as each other, but when the flight paths of an outward path and an inbound path are set to be different from each other, those flight distances take different values. The second consumption amount acquisition module 66B multiplies the flight distance $L_5$ by the second basic consumption amount to acquire the second consumption amount, information.

On the basis of the first, consumption amount, information and the second consumption amount information on each unmanned aerial vehicle 20, the search module 66 searches for the unmanned aerial vehicle 20 with the remaining amount of the battery or fuel for delivering the package by flying from the wait location to the collection destination, collecting the package, delivering the package to the delivery destination, and returning to the wait location serving as the delivery destination. The search module 66 refers to the unmanned aerial vehicle database to search for the unmanned aerial vehicle 20 with, the remaining amount information indicating the total consumption amount of the first consumption amount information and the second consumption amount information or more from among the unmanned aerial vehicles 20 that can be rented.

According to Modification Example (1), even when the delivery destination is the wait location of the unmanned aerial vehicle 20, the consumption amount that depends on the delivery destination is calculated, to thereby be able to search for the unmanned aerial vehicle 20 with the remaining amount information indicating a remaining amount sufficient enough to deliver the package and give an instruction to deliver the package.

(2) Further, for example, in the embodiment, only the unmanned aerial vehicle 20 waiting at the wait location can be rented, but the unmanned aerial vehicle 20 on the way back may also be rented. That is, the unmanned aerial vehicle 20 that has completed delivery of the previous package and is returning to the wait location may head to the collection destination of the next package.

Figure 13:
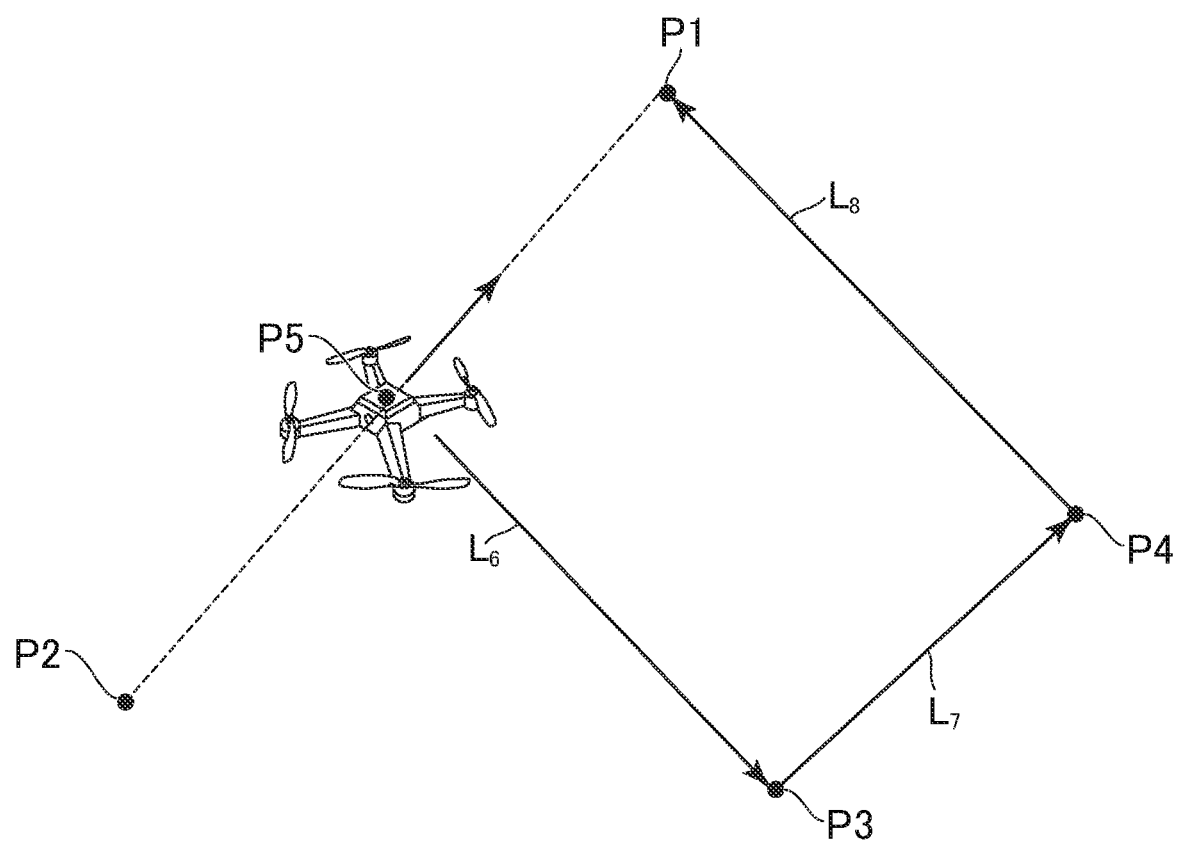
FIG. 13 is a diagram for illustrating a situation in which the unmanned aerial vehicle on the way back delivers a next package.

FIG. 13 is a diagram for illustrating the situation in which the unmanned aerial vehicle 20 on the way back delivers the next package. As illustrated in FIG. 13, when the unmanned aerial vehicle 20A is on the way back from a previous package delivery destination P2 to a wait location P1, and there is a sufficient remaining amount, of the battery or fuel or the unmanned aerial vehicle 20A is near a collection destination P3 or delivery destination P4 of the next package, the unmanned aerial vehicle can head to collect and deliver the next package. Thus, the unmanned aerial vehicle 20 on the way hack may also be included in targets to be searched for. However, the returning unmanned aerial vehicle 20 is not necessarily at the wait location, and thus the consumption amount of the battery or fuel is calculated based on a current position P5 of the unmanned aerial vehicle 20.

The server 10 in Modification Example (2) of the present invention includes the current position information acquisition module 70. The controller 11 mainly implements the current position information acquisition module 70. The current position information acquisition module 70 acquires the current position information on the current position of the unmanned aerial vehicle 20 in flight. The current position information acquisition module 70 acquires the current position information based on a result of communication by the communicator 23 of the unmanned aerial vehicle 20 and a result of detection by the sensor group 24 of the unmanned aerial vehicle 20. The current position information is only required to be information capable of identifying a location of the unmanned aerial vehicle 20. For example, the current position information may be information (e.g., access point of wireless LAN) on a base station to/from which the communicator 23 wirelessly communicates, or may be latitude/longitude information detected by the GPS sensor of the sensor group 24. A method of acquiring the current position information is not limited thereto, and various known techniques are applicable to the method of acquiring the current position information.

When there is an unmanned aerial vehicle 20 (namely, unmanned aerial vehicle 20 in state of "returning") on the way back, to the wait location after completing delivery of another package, the search module 66 searches for the unmanned aerial vehicle 20 with the remaining amount of the battery or fuel for flying from the current position to the collection destination, collecting the package, and delivering the collected package to the delivery destination based on the current position information on the unmanned aerial vehicle 20. In this case, the search module 66 may search for the unmanned aerial vehicle 20 by a search method that is implemented by setting "current position" as the departure location of the unmanned aerial vehicle 20 instead of "wait location" in the method described in the embodiment and Modification Example (1). That is, the first consumption amount acquisition module 66A may acquire the first consumption amount information based on a flight distance $L_6$, which is measured from the current position $P_5$ to the collection destination $P_3$, and a flight distance $L_8$, which is measured from the delivery destination $P_4$ to the wait location $P_1$. The second consumption amount acquisition module 66B may acquire the second consumption amount information based on a flight distance $L_7$, which is measured from the collection destination $P_3$ to the delivery destination $P_4$. It is assumed that the unmanned aerial vehicle 20 periodically transmits the own remaining amount information to the server 10 even during flight.

According to Modification Example (2), the unmanned aerial vehicle 20 on the way back can also be rented. As a result, when there is a collection destination or delivery destination of the next package on or near a path on the way back, the unmanned aerial vehicle 20 on the way back can visit the collection destination to collect the next package. Therefore, it is possible to save unnecessary movement of the unmanned aerial vehicle 20.

(3) Further, for example, the sky in which the unmanned aerial vehicle 20 actually flies is strongly influenced by the wind, and the consumption amount of the battery or fuel is different depending on the wind. Thus, the consumption amount until completion of delivery of the package may be calculated in consideration of the influence of the wind.

The server 10 in Modification Example (3) of the present invention includes the wind information acquisition module 71. The wind information acquisition module 71 acquires wind information on at least one of the wind direction or wind speed. The wind information acquisition module 71 may acquire both of the wind direction and wind speed, or may acquire only one thereof. The wind information acquisition module 71 acquires wind information based on a result of detection by a sensor or measuring instrument configured to measure the wind direction or wind speed. The sensor or measuring instrument may be installed at a fixed location of the ground, or may be included in the unmanned aerial vehicle 20 or another computer.

The search module 66 searches for an unmanned aerial vehicle with the remaining amount of the battery or fuel for delivering the package in a wind determined based on the wind information. For example, the search module 66 calculates the consumption amount of the battery or fuel until completion of delivery of the package based on the wind information. A relationship between the wind and the consumption amount may be determined in advance in the data storage 60. Further, this relationship may be determined in the consumption amount database. This relationship may be defined in a mathematical expression format or a table format, and for example, the consumption amount is defined to become larger as a deviation between the movement direction of the unmanned aerial vehicle 20 and the wind direction becomes larger and the wind speed is higher (adverse wind is stronger), whereas the consumption amount is defined to become larger as the deviation between the movement direction of the unmanned aerial vehicle 20 and the wind direction becomes smaller and the wind speed is lower (following wind is stronger).

The search module 66 acquires the movement direction of each path based on the wait location information on the unmanned aerial vehicle 20 and the package information, and calculates the consumption amount based on the acquired movement direction, the wind information, and the above-mentioned relationship. For example, the search module 66 compares the movement direction of the unmanned aerial vehicle 20 and the wind direction indicated by the wind information to identify whether or not the wind is a following wind or an adverse wind. Then, the search module 66 acquires the consumption amount in a case where the unmanned aerial vehicle 20 flies at a wind speed indicated by the wind information under a state of the identified following wind or adverse wind. Processing after that is similar to the method described in the embodiment or Modification Example (1).

According to Modification Example (3), the consumption amount, until completion of delivery is calculated, based on the influence of the wind, and the unmanned aerial vehicle 20 is searched for based on the consumption amount that depends on the current situation of the delivery path. Therefore, it is possible to improve the reliability of completing delivery.

(4) Further, for example, in the description of the embodiment, the user selects the unmanned aerial vehicle 20 from the list 53, but when the plurality of unmanned aerial vehicles 20 are searched for, the unmanned aerial vehicle 20 that, can reach the collection destination the earliest may automatically be selected without selection by the user.

When the plurality of unmanned aerial vehicles 20 are retrieved by the search module 66, the instruction module 69 instructs an unmanned aerial vehicle with the shortest, flight distance or flight time, which is measured from the wait location to the collection destination, to collect and deliver the package. The instruction module 69 calculates the flight distance from the wait location to the collection destination based on the wait location information on each unmanned aerial vehicle 20 and the package information. Further, the instruction module 69 calculates the flight time by dividing the flight distance by a flight speed of each unmanned aerial vehicle 20. The flight speed to be used may be a value different for each unmanned aerial vehicle 20, or may be the same value. When a flight speed different for each unmanned aerial vehicle 20 is used, the flight speed that is defined based on the model or weight, may be used.

According to Modification Example (4) of the present invention, the unmanned aerial vehicle 20 that can reach the collection destination the earliest can be caused to deliver the package, and thus it is possible to improve the convenience of the requester.

(5) Further, for example, the unmanned aerial vehicle 20 with the most sufficient remaining amount, may automatically be selected to more reliably complete delivery instead of selecting the unmanned aerial vehicle 20 that reaches the collection destination the earliest. When the plurality of unmanned aerial vehicles 20 are retrieved by the search module 66, the instruction module 69 in Modification Example (5) of the present invention instructs the unmanned aerial vehicle 20 with the largest, predicted remaining amount, of the battery or fuel at a time of completion of delivery of the package to collect and deliver the package. The instruction module 69 calculates the predicted remaining amount, at the time of completion of delivery by subtracting the consumption amount from the remaining amount information on each unmanned aerial vehicle 20.

According to Modification Example (5), the unmanned aerial vehicle 20 with the most sufficient, amount, of the battery can be caused to deliver the package, and thus it is possible to further improve the reliability of completing delivery.

(6) Further, for example, the owner may use the unmanned aerial vehicle 20 by himself or herself, and thus a time period available for rent may be registered in advance. The server 10 in Modification Example (6) of the present invention includes the time information acquisition module 72. The time information acquisition module 72 acquires time information on a time period during which the owner allows renting of the unmanned aerial vehicle 20. The time information acquisition module 72 acquires the time information input by the owner into the operation device 34 of the owner terminal 30.

The search module 66 searches for the unmanned aerial vehicle 20 that can deliver the package within the time period indicated by the time information on the unmanned aerial vehicle 20. The search module 66 calculates a departure time from the wait location and a return time to the wait location. Each of the departure time and the return time may indicate a date and time or only the time. The departure time may be a current time or may be a time specified by the requester. The search module 66 may calculate a total flight distance for completing delivery by each unmanned aerial vehicle 20 to acquire the return time. For example, the search module 66 may set the return time to a time elapsed since the departure time by a time period obtained by dividing the total flight distance by a predetermined speed, or may additionally consider a time period required for collecting or passing the package. The search module 66 searches for the unmanned aerial vehicle 20 for which a period from the departure time to the return time falls within the rental period completely.

According to Modification Example (6), the requester can rent the unmanned aerial vehicle 20 during a period in which the owner does not use the unmanned aerial vehicle 20, and thus it is possible to improve the convenience of the owner.

(7) Further, for example, any two or more of Modification Examples (1) to (6) may be combined with each other.

Further, for example, the collection destination may be the wait location of the unmanned aerial vehicle 20. In this case, for example, the unmanned aerial vehicle 20 waits at a store, for example, a convenience store, and the requester takes a package to be delivered to the store so that, the package is delivered. In this case, the search module 66 searches for the unmanned aerial vehicle 20 with the remaining amount for delivering the package collected at the wait location serving as the collection destination to the delivery destination, and returning to the wait location.

Further, for example, a description has been given based on the assumption that the consumption amount information indicates a consumption amount per predetermined distance, but the consumption amount, information may indicate a flight distance per predetermined amount of the battery or fuel. The consumption amount, information is only required to be information capable of identifying the consumption amount at a time when the unmanned aerial vehicle 20 flies. The search module 66 may calculate the consumption amount, in consideration of other factors, for example, an air resistance. Further, the package weight information and the aerial vehicle weight, information may be represented not by a numerical value but by a symbol indicating a level or rank of the weight.

Further, for example, a description has been given taking the case in which the owner rents the unmanned aerial vehicle 20 as an example, but the unmanned aerial vehicle 20 may not be rent by the owner. For example, the carrier or the business operator of an internet shopping mall may use its unmanned aerial vehicle 20 to provide a delivery service.

Further, for example, a description has been given of a case in which the server 10 implements each function, but functions other than those of the search module 66 may be implemented by the unmanned aerial vehicle 20. In this case, for example, data representing a result of search by the search module 66 may be transmitted to the unmanned aerial vehicle 20, and the unmanned aerial vehicle 20 may perform processing based on the received data, to thereby implement, for example, the functions of the presentation module 67 and the instruction module 69. Further, for example, when the unmanned aerial vehicle 20 implements the wait location information acquisition module 61, the remaining amount information acquisition module 62, and the package information acquisition module 63, the wait location information, the remaining amount information, and the package information, which are acquired by the unmanned aerial vehicle 20, may be transmitted to the server 10 so that the search module 66 of the server 10 searches for the unmanned aerial vehicle 20. Further, for example, a plurality of computers of the logistics system 1 may implement respective functions in a distributed manner. Further, functions other than those of the wait location information acquisition module 61, the remaining amount information acquisition module 62, the package information acquisition module 63, the search module 66, and the instruction module 69 may be omitted among the functions described above.

The invention claimed is:

1. A logistics system, comprising at least one processor and a plurality of unmanned aerial vehicles, the at least one processor configured to:
   acquire wait location information on a wait location of each of the plurality of unmanned aerial vehicles;
   acquire remaining amount information on a remaining amount of energy stored in a battery or fuel of each of the plurality of unmanned aerial vehicles;
   acquire package information on a collection destination and delivery destination of a package;
   maintain a state of each of the plurality of unmanned aerial vehicles from selection to delivering to waiting;
   search for an unmanned aerial vehicle based on (1) the state of the unmanned aerial vehicle being either returning or waiting and (2) a remaining amount of energy stored in the battery or fuel for delivering the package collected at the collection destination to the delivery destination based on the wait location information and remaining amount information on each of the plurality of unmanned aerial vehicles and the package information;
   select, in response to the search, the unmanned aerial vehicle; and
   transmit data to the unmanned aerial vehicle, the data being an instruction to collect and deliver the package, wherein the unmanned aerial vehicle is retrieved as a result of the search;
   wherein the unmanned aerial vehicle receives the data, collects the package at the collection destination, and transmits a collection completion notification to the processor;
      wherein the unmanned aerial vehicle determines, based on a result of a detection by a GNSS sensor group, whether the unmanned aerial vehicle has arrived at the collection destination;
   receive the collection completion notification and change the state of the unmanned aerial vehicle to delivering;
   wherein the unmanned aerial vehicle delivers the package, begins to fly to the wait location, and transmits a delivery completion notification to the processor;
   receive the delivery completion notification and change the state of the unmanned aerial vehicle to returning;
   wherein the unmanned aerial vehicle arrives at the wait location and transmits a return completion notification to the processor;
   receive the return completion notification and change the state of the unmanned aerial vehicle to waiting;
   wherein the collection destination and the delivery destination are locations different from the wait location of each of the plurality of unmanned aerial vehicles,
   wherein the at least one processor is configured to:
   determine a first consumption amount of energy stored in a battery or fuel for flying from the wait location to the collection destination and from the delivery destination to the wait location under a state in which the package is not loaded into each of the plurality of unmanned aerial vehicles;
   determine a second consumption amount of energy stored in the battery or fuel for flying from the collection destination to the delivery destination under a state in which the package is loaded into each of the plurality of unmanned aerial vehicles, and
   search for the unmanned aerial vehicle with a remaining amount of energy stored in the battery or fuel for flying from the wait location to the collection destination, collecting the package, delivering the package to the delivery destination, and returning to the wait location based on the first consumption amount and second consumption amount on each of the plurality of unmanned aerial vehicles.

2. The logistics system according to claim 1, wherein the at least one processor is configured to:
   acquire aerial vehicle weight information on a weight of each of the plurality of the unmanned aerial vehicles;
   acquire package weight information on a weight of the package,
   acquire the first consumption amount information on each of the plurality of unmanned aerial vehicles based on the aerial vehicle weight information on the each of the plurality of unmanned aerial vehicles, and
   acquire the second consumption amount information based on the aerial vehicle weight information on each of the plurality of unmanned aerial vehicles and the package weight information.

3. The logistics system according to claim 1, wherein the at least one processor is configured to:
   acquire current position information on a current position of an unmanned aerial vehicle in flight among the plurality of unmanned aerial vehicles, and
   search for, when there is an unmanned aerial vehicle on the way back to the wait location after completing delivery of another package, an unmanned aerial vehicle with a remaining amount of energy stored in the battery or fuel for flying from the current position to the collection destination, collecting the package, and delivering the collected package to the delivery destination based on the current position information on the unmanned aerial vehicle.

4. The logistics system according to claim 1, wherein the at least one processor is configured to:
acquire wind information on at least one of a wind direction or a wind speed, and
search for an unmanned aerial vehicle with a remaining amount of energy stored in the battery or fuel for delivering the package in a wind determined based on the wind information.

5. The logistics system according to claim 1, wherein the at least one processor is configured to instruct, when a plurality of unmanned aerial vehicles are retrieved, an unmanned aerial vehicle with a shortest flight distance or flight time, which is measured from the wait location to the collection destination, to collect and deliver the package.

6. The logistics system according to claim 1, wherein the at least one processor is configured to instruct, when a plurality of unmanned aerial vehicles are retrieved, an unmanned aerial vehicle with a largest predicted remaining amount of energy stored in the battery or fuel at a time of completion of delivery of the package, to collect and deliver the package.

7. The logistics system according to claim 1, wherein the at least one processor is configured to:
present a list of unmanned aerial vehicles to a requester who has requested collection and delivery of the package;
receive a selection by the requester from the list, and instruct an unmanned aerial vehicle selected by the requester to collect and deliver the package.

8. The logistics system according to claim 1,
wherein each of the plurality of unmanned aerial vehicles is to be rent by an owner of the each of the plurality of unmanned aerial vehicles to a requester who requests collection and delivery of the package, and
wherein the at least one processor is configured to acquire the wait location information on the wait location specified by the owner of each of the plurality of unmanned aerial vehicles.

9. The logistics system according to claim 8, wherein the at least one processor is configured to:
acquire time information on a time period during which the owner of each of the plurality of unmanned aerial vehicles allows renting of the each of the plurality of unmanned aerial vehicles, and
search for an unmanned aerial vehicle capable of delivering the package within a time period indicated by the time information on the unmanned aerial vehicle.

10. The logistics system according to claim 1, wherein the unmanned aerial vehicles obtain a direction using a geomagnetic sensor.

11. The logistics system according to claim 1, wherein the at least one processor is configured to select the unmanned aerial vehicle that is in a returning state.

12. A package delivery method, comprising:
acquiring wait location information on a wait location of each of a plurality of unmanned aerial vehicles;
acquiring remaining amount information on a remaining amount of energy stored in a battery or fuel of each of the plurality of unmanned aerial vehicles;
acquiring package information on a collection destination and delivery destination of a package;
maintaining a state of each of the plurality of unmanned aerial vehicles from selection to delivering to waiting;
searching for an unmanned aerial vehicle based on (1) the state of the unmanned aerial vehicle being either returning or waiting and (2) a remaining amount of energy stored in the battery or fuel for delivering the package collected at the collection destination to the delivery destination based on the wait location information and remaining amount information on each of the plurality of unmanned aerial vehicles and the package information;
selecting, in response to the searching, the unmanned aerial vehicle; and
transmitting data to the unmanned aerial vehicle, the data being an instruction to collect and deliver the package,
wherein the unmanned aerial vehicle is retrieved as a result of the search;
wherein the unmanned aerial vehicle receives the data, collects the package at the collection destination, and transmits a collection completion notification to a processor;
wherein the unmanned aerial vehicle determines, based on a result of a detection by a GNSS sensor group, whether the unmanned aerial vehicle has arrived at the collection destination;
receiving the collection completion notification and change the state of the unmanned aerial vehicle to delivering;
wherein the unmanned aerial vehicle delivers the package, begins to fly to the wait location, and transmits a delivery completion notification to the processor;
receiving the delivery completion notification and change the state of the unmanned aerial vehicle to returning;
wherein the unmanned aerial vehicle arrives at the wait location and transmits a return completion notification to the processor;
receiving the return completion notification and change the state of the unmanned aerial vehicle to waiting;
wherein the collection destination and the delivery destination are locations different from the wait location of each of the plurality of unmanned aerial vehicles,
wherein the package delivery method comprises:
determining a first consumption amount of energy stored in the battery or fuel for flying from the wait location to the collection destination and from the delivery destination to the wait location under a state in which the package is not loaded into each of the plurality of unmanned aerial vehicles;
determining a second consumption amount of energy stored in the battery or fuel for flying from the collection destination to the delivery destination under a state in which the package is loaded into each of the plurality of unmanned aerial vehicles, and
searching for the unmanned aerial vehicle with a remaining amount of energy stored in the battery or fuel for flying from the wait location to the collection destination, collecting the package, delivering the package to the delivery destination, and returning to the wait location based on the first consumption amount and the second consumption amount on each of the plurality of unmanned aerial vehicles.

13. A logistics system, comprising at least one processor and a plurality of unmanned aerial vehicles, the at least one processor configured to:
acquire wait location information on a wait location of each of the plurality of unmanned aerial vehicles;

acquire remaining amount information on a remaining amount of an energy stored in a battery or fuel of each of the plurality of unmanned aerial vehicles;
acquire package information on a collection destination and delivery destination of a package;
maintain a state of each of the plurality of unmanned aerial vehicles from selection to delivering to waiting;
search for an unmanned aerial vehicle based on (1) the state of the unmanned aerial vehicle being either returning or waiting and (2) a remaining amount of energy stored in the battery or fuel for delivering the package collected at the collection destination to the delivery destination based on the wait location information and remaining amount information on each of the plurality of unmanned aerial vehicles and the package information;
select, in response to the search, the unmanned aerial vehicle; and
transmit data to the unmanned aerial vehicle, the data being an instruction to collect and deliver the package, wherein the unmanned aerial vehicle is retrieved as a result of the search;
wherein the unmanned aerial vehicle receives the data, collects the package at the collection destination, and transmits a collection completion notification to the processor;
  wherein the unmanned aerial vehicle determines, based on a result of a detection by a GNSS sensor group, whether the unmanned aerial vehicle has arrived at the collection destination;
receive the collection completion notification and change the state of the unmanned aerial vehicle to delivering;
wherein the unmanned aerial vehicle delivers the package, begins to fly to the wait location, and transmits a delivery completion notification to the processor;
receive the delivery completion notification and change the state of the unmanned aerial vehicle to returning;
wherein the unmanned aerial vehicle arrives at the wait location and transmits a return completion notification to the processor;
receive the return completion notification and change the state of the unmanned aerial vehicle to waiting;
wherein the collection destination is a location different from the wait location of each of the plurality of unmanned aerial vehicles,
wherein the delivery destination is the wait location of each of the plurality of unmanned aerial vehicles,
wherein the at least one processor is configured to:
determine a first consumption amount of energy stored in the battery or fuel for flying from the wait location to the collection destination under a state in which the package is not loaded into each of the plurality of unmanned aerial vehicles;
determine a second consumption amount of energy stored in the battery or fuel for flying from the collection destination to the wait location serving as the delivery destination under a state in which the package is loaded into each of the plurality of unmanned aerial vehicles, and
search for the unmanned aerial vehicle with a remaining amount of energy stored in the battery or fuel for delivering the package by flying from the wait location to the collection destination, collecting the package, and returning to the wait location serving as the delivery destination based on the first consumption amount and the second consumption amount on each of the plurality of unmanned aerial vehicles.

14. A package delivery method, comprising:
acquiring wait location information on a wait location of each of a plurality of unmanned aerial vehicles;
acquiring remaining amount information on a remaining amount of an energy stored in a battery or fuel of each of the plurality of unmanned aerial vehicles;
acquiring package information on a collection destination and delivery destination of a package;
maintaining a state of each of the plurality of unmanned aerial vehicles from selection to delivering to waiting;
searching for an unmanned aerial vehicle based on (1) the state of the unmanned aerial vehicle being either returning or waiting and (2) a remaining amount of energy stored in the battery or fuel for delivering the package collected at the collection destination to the delivery destination based on the wait location information and remaining amount information on each of the plurality of unmanned aerial vehicles and the package information;
selecting, in response to the searching, the unmanned aerial vehicle; and
transmitting data to the unmanned aerial vehicle, the data being an instruction to collect and deliver the package, wherein the unmanned aerial vehicle is retrieved as a result of the search;
wherein the unmanned aerial vehicle receives the data, collects the package at the collection destination, and transmits a collection completion notification to a processor;
wherein the unmanned aerial vehicle determines, based on a result of a detection by a GNSS sensor group, whether the unmanned aerial vehicle has arrived at the collection destination;
receiving the collection completion notification and change the state of the unmanned aerial vehicle to delivering;
wherein the unmanned aerial vehicle delivers the package, begins to fly to the wait location, and transmits a delivery completion notification to the processor;
receiving the delivery completion notification and change the state of the unmanned aerial vehicle to returning;
wherein the unmanned aerial vehicle arrives at the wait location and transmits a return completion notification to the processor;
receiving the return completion notification and change the state of the unmanned aerial vehicle to waiting;
wherein the collection destination is a location different from the wait location of each of the plurality of unmanned aerial vehicles,
wherein the delivery destination is the wait location of each of the plurality of unmanned aerial vehicles,
wherein the package delivery method comprises:
determining a first consumption amount of energy stored in the battery or fuel for flying from the wait location to the collection destination under a state in which the package is not loaded into each of the plurality of unmanned aerial vehicles;
determining a second consumption amount of energy stored in the battery or fuel for flying from the collection destination to the wait location serving as the delivery destination under a state in which the package is loaded into each of the plurality of unmanned aerial vehicles, and
searching for the unmanned aerial vehicle with a remaining amount of energy stored in the battery or fuel for delivering the package by flying from the wait location to the collection destination, collecting the package, and returning to the wait location serving as the delivery destination based on the first consumption amount and the second consumption amount on each of the plurality of unmanned aerial vehicles.

15. A logistics system, comprising at least one processor and a plurality of unmanned aerial vehicles, the at least one processor configured to:
    acquire wait location information on a wait location of each of a plurality of unmanned aerial vehicles;
    acquire remaining amount information on a remaining amount of an energy stored in a battery or fuel of each of the plurality of unmanned aerial vehicles;
    acquire package information on a collection destination and delivery destination of a package;
    maintain a state of each of the plurality of unmanned aerial vehicles from selection to delivering to waiting
    search for an unmanned aerial vehicle based on (1) the state of the unmanned aerial vehicle being either returning or waiting and (2) a remaining amount of energy stored in the battery or fuel for delivering the package collected at the collection destination to the delivery destination based on the wait location information and remaining amount information on each of the plurality of unmanned aerial vehicles and the package information;
    select, in response to the search, the unmanned aerial vehicle; and
    transmit data to the unmanned aerial vehicle, the data being an instruction to collect and deliver the package,
    wherein the unmanned aerial vehicle is retrieved as a result of the search;
    wherein the unmanned aerial vehicle receives the data, collects the package at the collection destination, and transmits a collection completion notification to the processor;
        wherein the unmanned aerial vehicle determines, based on a result of a detection by a GNSS sensor group, whether the unmanned aerial vehicle has arrived at the collection destination;
    receive the collection completion notification and change the state of the unmanned aerial vehicle to delivering;
    wherein the unmanned aerial vehicle delivers the package, begins to fly to the wait location, and transmits a delivery completion notification to the processor;
    receive the delivery completion notification and change the state of the unmanned aerial vehicle to returning;
    wherein the unmanned aerial vehicle arrives at the wait location and transmits a return completion notification to the processor;
    receive the return completion notification and change the state of the unmanned aerial vehicle to waiting;
    wherein the collection destination is the wait location of each of the plurality of unmanned aerial vehicles,
    wherein the delivery destination is a location different from the wait location of each of the plurality of unmanned aerial vehicles,
    wherein the at least one processor is configured to:
    determine a first consumption amount of energy stored in the battery or fuel for flying from the delivery destination to the wait location under a state in which the package is not loaded into each of the plurality of unmanned aerial vehicles;
    determine a second consumption amount of energy stored in the battery or fuel for flying from the wait location serving as the collection location to the delivery destination under a state in which the package is loaded into each of the plurality of unmanned aerial vehicles, and
    search for the unmanned aerial vehicle with a remaining amount of energy stored in the battery or fuel for delivering the package by collecting the package, flying from the wait location serving as the collection location to the delivery destination, and returning to the wait location based on the first consumption amount and the second consumption amount on each of the plurality of unmanned aerial vehicles.

16. A package delivery method, comprising:
    acquiring wait location information on a wait location of each of a plurality of unmanned aerial vehicles;
    acquiring remaining amount information on a remaining amount of an energy stored in a battery or fuel of each of the plurality of unmanned aerial vehicles;
    acquiring package information on a collection destination and delivery destination of a package;
    maintaining a state of each of the plurality of unmanned aerial vehicles from selection to delivering to waiting;
    searching for an unmanned aerial vehicle based on (1) the state of the unmanned aerial vehicle being either returning or waiting and (2) a remaining amount of energy stored in the battery or fuel for delivering the package collected at the collection destination to the delivery destination based on the wait location information and remaining amount information on each of the plurality of unmanned aerial vehicles and the package information;
    selecting, in response to the searching, the unmanned aerial vehicle; and
    transmitting data to the unmanned aerial vehicle, the data being an instruction to collect and deliver the package,
    wherein the unmanned aerial vehicle is retrieved as a result of the search;
    wherein the unmanned aerial vehicle receives the data, collects the package at the collection destination, and transmits a collection completion notification to a processor;
        wherein the unmanned aerial vehicle determines, based on a result of a detection by a GNSS sensor group, whether the unmanned aerial vehicle has arrived at the collection destination;
    receiving the collection completion notification and change the state of the unmanned aerial vehicle to delivering;
    wherein the unmanned aerial vehicle delivers the package, begins to fly to the wait location, and transmits a delivery completion notification to the processor;
    receiving the delivery completion notification and change the state of the unmanned aerial vehicle to returning;
    wherein the unmanned aerial vehicle arrives at the wait location and transmits a return completion notification to the processor;
    receiving the return completion notification and change the state of the unmanned aerial vehicle to waiting;
    wherein the collection destination is the wait location of each of the plurality of unmanned aerial vehicles,
    wherein the delivery destination is a location different from the wait location of each of the plurality of unmanned aerial vehicles,
    wherein the package delivery method comprises:
    determining a first consumption amount of energy stored in the battery or fuel for flying from the delivery destination to the wait location under a state in which the package is not loaded into each of the plurality of unmanned aerial vehicles;

determining a second consumption amount of energy stored in the battery or fuel for flying from the wait location serving as the collection location to the delivery destination under a state in which the package is loaded into each of the plurality of unmanned aerial vehicles, and searching for the unmanned aerial vehicle with a remaining amount of energy stored in the battery or fuel for delivering the package by collecting the package, flying from the wait location serving as the collection location to the delivery destination, and returning to the wait location based on the first consumption amount and the second consumption amount on each of the plurality of unmanned aerial vehicles.

\* \* \* \* \*